(12) United States Patent
Daigi

(10) Patent No.: US 8,441,527 B2
(45) Date of Patent: May 14, 2013

(54) THREE-DIMENSIONAL IMAGE PROCESSING APPARATUS AND METHOD OF CONTROLLING THE SAME

(75) Inventor: Tomoaki Daigi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/197,137

(22) Filed: Aug. 3, 2011

(65) Prior Publication Data
US 2011/0285706 A1   Nov. 24, 2011

Related U.S. Application Data

(63) Continuation of application No. PCT/JP2010/004786, filed on Jul. 28, 2010.

(30) Foreign Application Priority Data

Sep. 29, 2009  (JP) ................................. 2009-225590

(51) Int. Cl.
*H04N 5/45* (2011.01)
(52) U.S. Cl.
USPC ............................................. 348/54; 348/42
(58) Field of Classification Search ..................... 348/52, 348/24, 54, 42
See application file for complete search history.

(56) References Cited

U.S. PATENT DOCUMENTS

| | | | |
|---|---|---|---|
| 7,724,271 B2 | 5/2010 | Ha et al. | |
| 2006/0062490 A1 | 3/2006 | Ha et al. | |
| 2009/0219382 A1* | 9/2009 | Routhier et al. | 348/43 |
| 2010/0045780 A1* | 2/2010 | Kwon et al. | 348/51 |
| 2010/0091091 A1* | 4/2010 | Kim | 348/42 |
| 2010/0091098 A1* | 4/2010 | Yoshifuji et al. | 348/54 |
| 2011/0050851 A1* | 3/2011 | Chen et al. | 348/43 |

FOREIGN PATENT DOCUMENTS

| | | |
|---|---|---|
| JP | 2000-293155 | 10/2000 |
| JP | 2003-319417 | 11/2003 |
| JP | 2005-134663 | 5/2005 |
| JP | 2006-033851 | 2/2006 |
| JP | 2008-306540 | 12/2008 |

OTHER PUBLICATIONS

International Search Report for PCT/JP2010/004786, dated Oct. 12, 2010.

* cited by examiner

*Primary Examiner* — Mehrdad Dastouri
*Assistant Examiner* — Mohammed Rahaman
(74) *Attorney, Agent, or Firm* — McDermott Will & Emery LLP

(57) ABSTRACT

A 3D image processing apparatus includes: a main screen image processing unit which generates a main screen processed image by performing a format conversion process on a main screen image; a sub screen image processing unit which generates a sub screen processed image by performing a format conversion process on a sub screen image; and a synthesizing unit which generates a synthesized image by synthesizing the main screen processed image and the sub screen processed image. Furthermore, the main screen image processing unit generates a left screen output image by performing the format conversion process on a left screen input image that is a left half of a 3D image, and the sub screen image processing unit generates a right screen output image by performing the format conversion process on a right screen input image that is a right half of a 3D image.

9 Claims, 18 Drawing Sheets

THREE-DIMENSIONAL IMAGE PROCESSING APPARATUS AND METHOD OF CONTROLLING THE SAME

CROSS REFERENCE TO RELATED APPLICATION

This is a continuation application of PCT application No. PCT/JP2010/004786 filed on Jul. 28, 2010, designating the United States of America.

BACKGROUND OF THE INVENTION (1) Field of the Invention

The present invention relates to three-dimensional (3D) image processing apparatuses and methods of controlling the same, and in particular to a 3D image processing apparatus which converts a 3D image of a first format to a 3D image of a second format.

(2) Description of the Related Art

A 3D image displaying appratus is known, which displays a 3D image that is a two-dimensional (2D) image providing a viewer with stereoscopic perception (see, for example, Japanese Unexamined Patent Application Publication No. 2000-293155, referred hereinafter as Patent Literature 1). In addition, a television set for home use which is capable of displaying such a 3D image is now being in practical use.

The 3D image displaying apparatus displays a right-eye image and a left-eye image between which a parallax is present, thereby displaying an image which provides a viewer with stereoscopic perception. The 3D image displaying apparatus alternately displays each left-eye image and each right-eye image on a per frame basis, for example.

SUMMARY OF THE INVENTION

However, when a 3D image is to be provided while maintaining an image quality equivalent to an image quality of a conventional 2D image, it is necessary to display two types of images; that is, a right-eye image and a left-eye image, in the 3D image. Accordingly, it is necessary to display an image at a frame rate (120 fps, for example) that is twice as high as a frame rate (60 fps, for example) of the conventional 2D image.

In view of the above, the 3D image displaying apparatus needs to include an image processing circuit capable of processing an image having a twice as high frame rate. When such a high-performance image processing circuit is to be embodied, there is a problem of cost increase and the need for a substantial change in the circuit of the conventional image displaying apparatus.

Meanwhile, Patent Literature 1 implements high-speed image processing without having a high-performance image processing circuit, by causing plural graphics processing units to operate in parallel.

However, even when plural image processing circuits (graphics processing units) are used, cost still increases due to the increase in the number of the image processing circuits.

In view of the above-described problems, an object of the present invention is to provide a 3D image processing apparatus which can generate a high-quality 3D image while preventing cost increase, and a method of controlling the same.

In order to achieve the object described above, a three-dimensional (3D) image processing apparatus according to an embodiment of the present invention is a 3D image processing apparatus which has (i) a two-screen processing mode in which a synthesized image including a first image and a second image in a single screen is generated and (ii) a 3D image processing mode in which a first input 3D image in a first format is converted into an output 3D image in a second format, the 3D image processing apparatus comprising: a first image processing unit configured to perform, in the two-screen processing mode, a first format conversion process on the first image to generate a first processed image; a second image processing unit configured to perform, in the two-screen processing mode, a second format conversion process on the second image to generate a second processed image; a synthesizing unit configured to synthesize the first processed image and the second processed image to generate the synthesized image; and an output unit configured to output the synthesized image in the two-screen processing mode and output the output 3D image in the 3D image processing mode, wherein the first image processing unit is configured to perform, in the 3D image processing mode, a third format conversion process on a left screen input image that is a left half of the first input 3D image, to generate a left screen output image that is a left half of the output 3D image, the second image processing unit is configured to perform, in the 3D image processing mode, a fourth format conversion process on a right screen input image that is a right half of the first input 3D image, to generate a right screen output image that is a right half of the output 3D image, and the output processing unit is configured to output the left screen output image and the right screen output image in the 3D image processing mode.

With the above-described configuration, in the 3D image processing apparatus according to an embodiment of the present invention, the first image processing unit processes the left screen input image that is a left half of the first input 3D image, and the second image processing unit processes the right screen input image that is a right half of the first input 3D image, in the 3D image processing mode. By performing the parallel processing as described above, it is possible to reduce the necessary processing capacity of the first image processing unit and the second image processing unit to approximately half, compared with the case where a single image processing unit processes the input 3D image.

Furthermore, with the 3D image processing apparatus according to an embodiment of the present invention, by using the first image processing unit that processes the first image and the second image processing unit that processes the second image for the parallel processing in the two-screen processing mode, it is possible to avoid addition of a circuit to a conventional processing apparatus. Thus, the 3D image processing apparatus 100 according to an embodiment of the present invention can generate a high-quality 3D image while preventing cost increase.

In addition, each of the first, second, third, and fourth format conversion processes may include at least one of changing an image size, converting a frame rate, and conversion from an interlace scheme to a progressive scheme.

In addition, each of the third and fourth format conversion processes may include increasing a frame rate.

With the above-described configuration, the 3D image processing apparatus 100 according to the embodiment of the present invention can generate a high-quality 3D image with a high frame rate while preventing cost increase.

In addition, the first input 3D image and the output 3D image may include a left-eye image viewed by a left eye of a viewer and a right-eye image viewed by a right eye of the viewer, and each of the third and fourth format conversion processes may further include changing an arrangement pattern of the left-eye image and the right-eye image.

In addition, each of the first, second, third, and fourth format conversion processes may include the conversion from the interlace scheme to the progressive scheme.

In addition, the 3D image processing apparatus may further comprise a memory, wherein the first image processing unit may include a first preprocessing unit configured to generate, in the 3D image processing mode, a third processed image by performing a first preprocess on the left screen input image, and store the third processed image in the memory, the first preprocess being included in the third format conversion process and including reducing the image size, the second image processing unit may include a second preprocessing unit configured to generate, in the 3D image processing mode, a fourth processed image by performing a second preprocess on the right screen input image, and store the fourth processed image in the memory, the second preprocess being included in the fourth format conversion process and including the reducing the image size, and the first image processing unit may further include: a first postprocessing unit configured to generate, in the 3D image processing mode, the left screen output image by performing a first postprocess on a fifth processed image including at least one of the third processed image and the fourth processed image which are stored in the memory, the first postprocess being included in the third format conversion process and including enlarging the image size; and a second postprocessing unit configured to generate, in the 3D image processing mode, the right screen output image by performing a second postprocess on a sixth processed image including at least one of the third processed image and the fourth processed image which are stored in the memory, the second postprocess being included in the fourth format conversion process and including the enlarging the image size.

With the above-described configuration, in the 3D image processing apparatus according to the embodiment of the present invention, it is possible to reduce a necessary capacity of a memory by storing, into the memory, an image whose image size has been compressed, for example.

In addition, each of the first and second postprocesses may further include changing an arrangement pattern of the left-eye image and the right-eye image, the first postprocessing unit may be configured to generate the left screen output image by reading the fifth processed image and performing the first postprocess on the fifth processed image, the fifth processed image including pixels corresponding to the left screen output image, among pixels included in the third processed image and the fourth processed image which are stored in the memory, and the second postprocessing unit may be configured to generate the right screen output image by reading the sixth processed image and performing the second postprocess on the sixth processed image, the sixth processed image including pixels corresponding to the right screen output image, among pixels included in the third processed image and the fourth processed image which are stored in the memory.

With the above-described configuration, in the 3D image processing apparatus according to the embodiment of the present invention, it is possible to appropriately perform pattern conversion on the left-eye image and the right-eye image even when pixels corresponding to the left screen output image are included in the fourth processed image. Likewise, in the 3D image processing apparatus according to an embodiment of the present invention, it is possible to appropriately perform pattern conversion on the left-eye image and the right-eye image even when pixels corresponding to the right screen output image are included in the third processed image.

In addition, each of the first and second preprocesses may include the conversion from the interlace scheme to the progressive scheme, of a scanning scheme.

In addition, each of the first, second, third, and fourth format conversion processes may include at least one of changing an image size and converting a frame rate, and the 3D image processing apparatus may further comprise: a first IP conversion unit configured to generate, in the two-screen processing mode, the first image by converting a third image from an interlace scheme to a progressive scheme; and a second IP conversion unit configured to generate, in the two-screen processing mode, the second image by converting a fourth image from the interlace scheme to the progressive scheme, and the first IP conversion unit may be configured to generate, in the 3D image processing mode, the first input 3D image by converting a second input 3D image from the interlace scheme to the progressive scheme.

In addition, the 3D image processing apparatus may further comprise an input selecting unit configured to divide, in the 3D image processing mode, the first input 3D image into the left screen input image and the right screen input image.

It is to be noted that the present invention can be implemented not only as a 3D image processing apparatus but also as a method of controlling the 3D image processing apparatus including characteristic units included in the 3D image processing apparatus as steps, a 3D image processing method, and a program for causing a computer to execute the characteristic steps. It should be understood that such a program can be distributed via a recording medium such as a CD-ROM and a transmission medium such as the Internet.

Furthermore, the present invention can be implemented as a semiconductor integrated circuit (LSI) that implements part or all of the functions of such a 3D image processing apparatus, a 3D image displaying apparatus including such a 3D image processing apparatus, such as a digital television, and a 3D image displaying system including such a 3D image displaying apparatus.

As described above, the present invention can provide a 3D image processing apparatus which can generate a high-quality 3D image while preventing cost increase.

FURTHER INFORMATION ABOUT TECHNICAL BACKGROUND TO THIS APPLICATION

The disclosure of Japanese Patent Application No. 2009-225590 filed on Sep. 29, 2009 including specification, drawings and claims is incorporated herein by reference in its entirety.

The disclosure of PCT application No. PCT/JP2010/004786 filed on Jul. 28, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

The following describes in detail, with reference to the diagrams, embodiments of a 3D image processing apparatus according to the present invention.

Embodiment 1

A 3D image processing apparatus according to Embodiment 1 of the present invention divides a 3D image into two images and performs parallel processing on the divided two images in two image processing units. In addition, the 3D image processing apparatus according to Embodiment 1 of the present invention, when displaying a main screen image and a sub screen image in a single screen, uses an image processing unit used for processing the main screen image and an image processing unit used for processing the sub screen image for the parallel processing. This configuration allows the image processing apparatus according to Embodiment 1 of the present invention to avoid addition of a circuit, and thus it is possible to generate a high-quality 3D image while preventing cost increase.

First, a configuration of a 3D image displaying system that includes the 3D image processing apparatus according to Embodiment 1 of the present invention is described.

Figure 1:
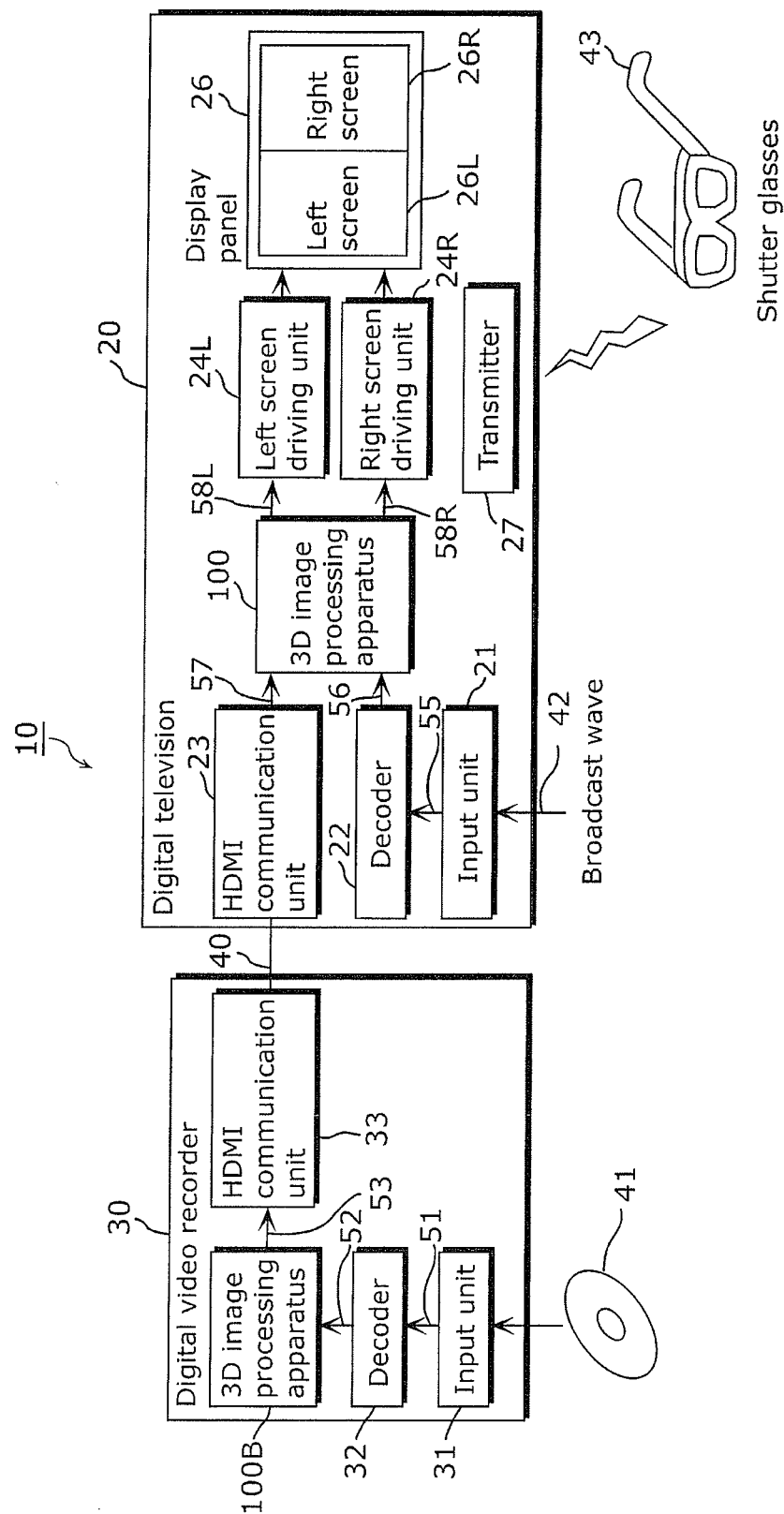
FIG. 1 is a block diagram which shows a configuration of a 3D image displaying system according to Embodiment 1 of the present invention.

FIG. 1 is a block diagram which shows a configuration of a 3D image displaying system according to Embodiment 1 of the present invention.

A 3D image displaying system 10 shown in FIG. 1 includes: a digital television 20; a digital video recorder 30; and shutter glasses 43. In addition, the digital television 20 and the digital video recorder 30 are connected via an HDMI (high-definition multimedia interface) cable 40.

The digital video recorder 30 converts a format of a 3D image recorded on an optical disk 41 such as a BD (Blu-ray Disk) and outputs the converted 3D image to the digital television 20 via the HDMI cable 40.

The digital television 20 converts the format of the 3D image output from the digital video recorder 30 and a 3D image included in a broadcast wave 42 and displays the images. The broadcast wave 42 is, for example, digital terrestrial television broadcasting, digital satellite television broadcasting, and the like.

It is to be noted that the digital video recorder 30 may convert the format of a 3D image recorded on a recording medium other than the optical disk 41 (for example, a hard disk drive, a nonvolatile memory, and the like). In addition, the digital video recorder 30 may convert the format of a 3D image included in the broadcast wave 42 or a 3D image obtained via the communication network such as the Internet. In addition, the digital video recorder 30 may convert the format of a 3D image that has been input into an external input terminal or the like (not illustrated) by an external device.

Likewise, the digital television 20 may convert the format of a 3D image recorded on the optical disk 41 or a recording medium other than the optical disk 41. In addition, the digital television 20 may convert the format of a 3D image obtained via the communication network such as the Internet. In addition, the digital television 20 may convert the format of a 3D image that has been input into an external input terminal or the like (not illustrated) by an external device other than the digital video recorder 30.

In addition, the digital television 20 and the digital video recorder 30 may be connected via a standardized cable other than the HDMI cable 40, or may be connected via a radio communication network.

The digital video recorder 30 includes: an input unit 31; a decoder 32; a 3D image processing apparatus 100B and an HDMI communication unit 33.

The input unit 31 obtains a coded 3D image 51 recorded on the optical disk 41.

The decoder 32 decodes the coded 3D image 51 obtained by the input unit 31, thereby generating an input 3D image 52.

The 3D image processing apparatus 100B converts the format of the input 3D image 52, thereby generating an output 3D image 53.

The HDMI communication unit 33 outputs the output 3D image 53 generated by the 3D image processing apparatus 100B, to the digital television 20 via the HDMI cable 40.

It is to be noted that the digital video recorder 30 may store the generated output 3D image 53 on a storage unit (a hard disk drive, a nonvolatile memory, or the like) included in the digital video recorder 30, or on a recording medium (an optical disk or the like) detachable to the digital video recorder 30.

The digital television 20 includes: an input unit 21; a decoder 22; an HDMI communication unit 23; a 3D image processing apparatus 100; a left screen driving unit 24L; a right screen driving unit 24R; a display panel 26; and a transmitter 27.

The input unit 21 obtains a coded 3D image 55 include in the broadcast wave 42.

The decoder 22 decodes the coded 3D image 55 obtained by the input unit 21, thereby generating an input 3D image 56.

The HDMI communication unit 23 obtains the output 3D image 53 that has been output from the HDMI communication unit 33, and outputs the output 3D image 53 as an input 3D image 57.

The 3D image processing apparatus 100 converts the format of the input 3D image 56 or the input 3D image 57, thereby generating an output 3D image 58. Here, the output 3D image 58 includes a left screen image 58L and a right screen image 58R.

The left screen driving unit 24L displays the left screen image 58L on the left screen 26L of the display panel 26. The right screen driving unit 24R displays the right screen image 58R on the right screen 26R of the display panel 26.

The transmitter 27 uses a radio communication to control the shutter glasses 43.

The following describes a format converting process performed by the 3D image processing apparatus 100. It is to be noted that, the format converting process performed on the input 3D image 56 by the 3D image processing apparatus 100 is explained as an example below. The same explanation is applied to the format converting process performed on the input 3D image 57 by the 3D image processing apparatus 100 and the format converting process performed on the input 3D image 52 by the 3D image processing apparatus 100B as well.

Here, a format includes: an arrangement pattern for a left-eye image and a right-eye image in each frame (field) (hereinafter simply referred to as "arrangement pattern"); a frame rate; a scanning scheme (progressive and interlace); and an image size.

More specifically, the 3D image processing apparatus 100 converts at least one of the arrangement pattern, the frame rate, the scanning scheme, and the image size of the input 3D image 56, thereby generating the output 3D image 58.

Figure 2A:
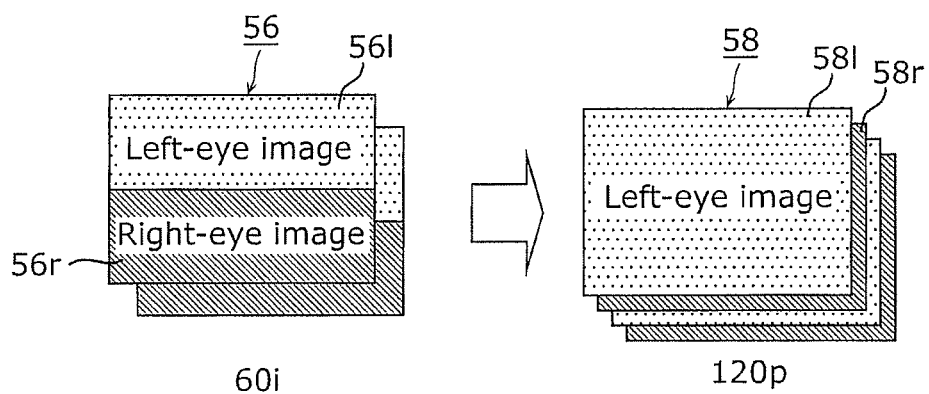
FIG. 2A is a diagram which shows an example of a format converting process performed by the 3D image processing apparatus according to Embodiment 1 of the present invention.
Figure 2B:
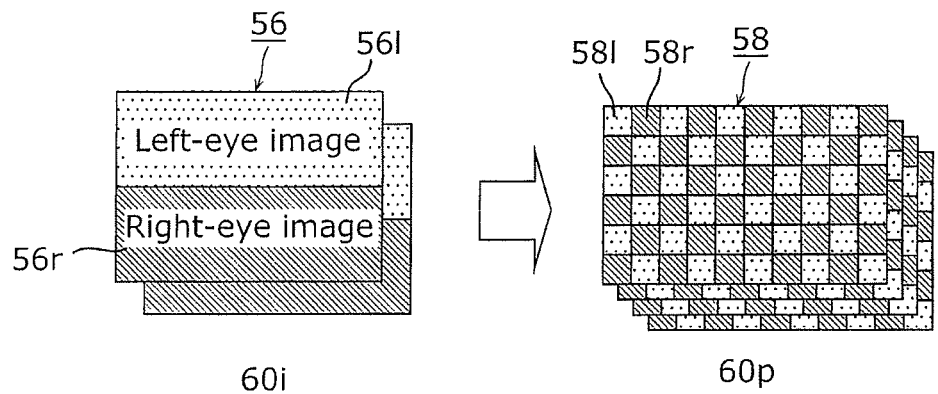
FIG. 2B is a diagram which shows an example of the format converting process performed by the 3D image processing apparatus according to Embodiment 1 of the present invention.

FIG. 2A and FIG. 2B are diagrams which show examples of the format converting process performed by the 3D image processing apparatus 100.

As shown in FIG. 2A, for example, the input 3D image 56 includes a left-eye image 56*l* and a right image 56*r* in each of the fields. The 3D image processing apparatus 100 converts the arrangement pattern of the input 3D image 56, thereby generating the output 3D image 58 in which a frame including only the left-eye image 58*l* and a frame including only the right-eye image 58*r* are alternately arranged.

In addition, the 3D image processing apparatus 100 converts the input 3D image 56 of 60i (the interlace scheme at 60 fps frame rate) into the output 3D image 58 of 120p (the progressive scheme at 120 fps frame rate).

In addition, the shutter glasses 43 are glasses worn by a viewer and are, for example, liquid crystal shutter glasses. The shutter glasses 43 include a left-eye liquid crystal shutter and a right-eye liquid crystal shutter. The transmitter 27 controls opening and closing of the left-eye liquid crystal shutter and the right-eye liquid crystal shutter with the same timing of displaying the left-eye image 58*l* and the right-eye image 58*r*. To be more specific, the transmitter 27 causes the left-eye liquid crystal shutter of the shutter glasses 43 to open and the right-eye liquid crystal shutter of the shutter glasses 43 to close during a period in which the left-eye image 58*l* is displayed. In addition, the transmitter 27 causes the left-eye liquid crystal shutter of the shutter glasses 43 to close and the right-eye liquid crystal shutter of the shutter glasses 43 to open during a period in which the right-eye image 58*r* is displayed. As described above, the left-eye image 58*l* and the right-eye image 58*r* respectively and selectively enter the left eye and the right eye of the viewer.

It is to be noted that the method for causing the left-eye image 58*l* and the right-eye image 58*r* to respectively and selectively enter the left eye and the right eye of the viewer is not limited to the method described above, and a method other than the method described above may be used.

As shown in FIG. 2B, for example, the input 3D image 56 includes a left-eye image 56*l* and a right-eye image 56*r* in each of the fields. The 3D image processing apparatus 100B converts the input 3D image 56 into the output 3D image 58 in which the left-eye image 58*l* and the right-eye image 58*r* are arranged in a checkered pattern in each of the frames.

In this case, the display panel 26 includes a left-eye polarizing film formed on pixels for a left eye and a right-eye polarizing film formed on pixels for a right eye to cause the left-eye image 58*l* and the right-eye image 58*r* to be subject to different polarizations (linear polarization, circular polarization, or the like). In addition, it is possible to cause the left-eye image 58*l* and the right-eye image 58*r* to enter the left eye and the right eye, respectively, of the viewer, by employing, instead of the shutter glasses 43, polarization glasses that includes a left-eye polarization filter and a right-eye polarization filter which correspond to the above respective polarizations.

Furthermore, the arrangement pattern of the output 3D image 58 and the arrangement pattern of the above-described polarizing film are the same, in this case.

It is to be noted that it is only necessary for the arrangement pattern of each of the input 3D image 56 and the output 3D image 58 to be one of the arrangement patterns described below.

FIGS. 3A, 3B, 4A, 4B, 5A, 5B, 6A, and 6B are diagrams which show arrangement patterns of the 3D image.

Figure 3A:
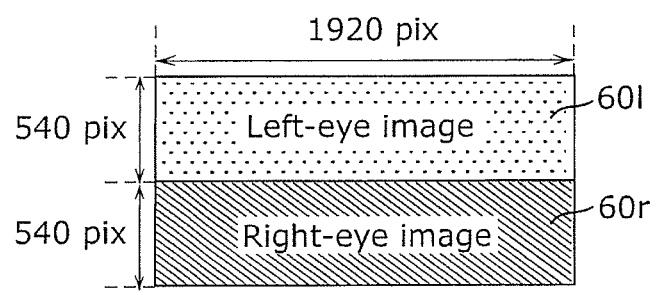
FIG. 3A is a diagram which shows an example of an arrangement pattern of a 3D image according to Embodiment 1 of the present invention.

In the arrangement pattern shown in FIG. 3A, a left-eye image 60*l* and a right-eye image 60*r* are arranged next to each other in a vertical direction. This arrangement pattern is hereinafter called a frame sequential.

Figure 3B:
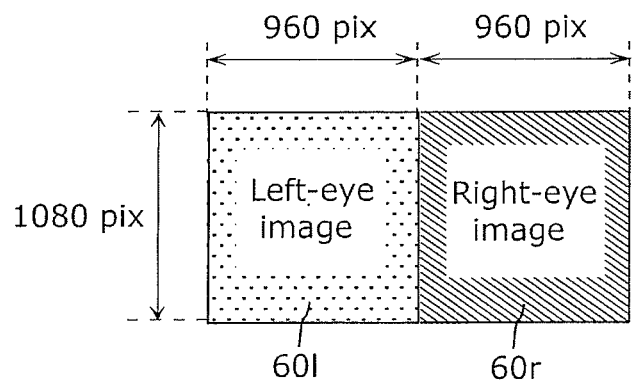
FIG. 3B is a diagram which shows an example of the arrangement pattern of the 3D image according to Embodiment 1 of the present invention.

In the format shown in FIG. 3B, the left-eye image 60*l* and the right-eye image 60*r* are arranged side-by-side in a horizontal direction. This arrangement pattern is hereinafter called a side by side.

In addition, in the examples shown in FIG. 3A and FIG. 3B, a so-called full hi-vision image including 1920×1080 pixels in columns and rows in one frame is shown as an example; however, the number of pixels included in one frame is not limited to the above-described number. One example may be a so-called hi-vision image including, for example, 1270×720 pixels in columns and rows in one frame.

In addition, each frame includes the left-eye image 60*l* and the right-eye image 60*r* compressed to the half in the vertical direction and in the horizontal direction, respectively in the examples shown in FIG. 3A and FIG. 3B; however, each frame may include the left-eye image 60*l* and the right-eye image 60*r* having 1920×1080 pixels in columns and rows which are not compressed. In addition, compression may be carried out with a compression rate other than the half, or in both of the vertical and horizontal directions.

Furthermore, the scanning scheme of the 3D image may be the progressive scheme, or may be the interlace scheme with which a top field and a bottom field are arranged alternately.

In addition, the frame rate of the 3D image may be an arbitrary value.

Figure 4A:
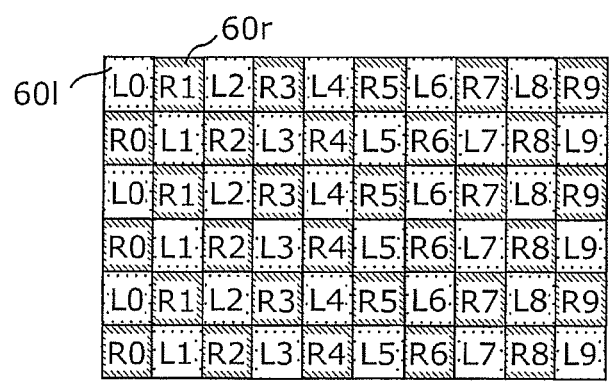
FIG. 4A is a diagram which shows an example of the arrangement pattern of the 3D image according to Embodiment 1 of the present invention.
Figure 4B:
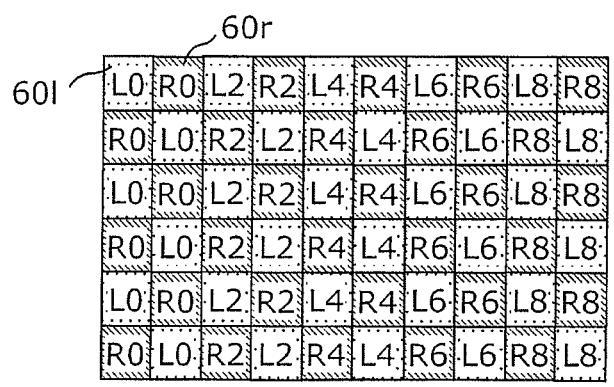
FIG. 4B is a diagram which shows an example of the arrangement pattern of the 3D image according to Embodiment 1 of the present invention.

In the arrangement patterns shown in FIG. 4A and FIG. 4B, the left-eye image 60*l* and the right-eye image 60*r* are arranged in a checkered pattern. This arrangement pattern is hereinafter called a checker pattern. It is to be noted that, although only 10×6 pixels in columns and rows are shown for simplification in FIGS. 4A, 4B, 5A, 5B, 6A, and 6B, the above-described number of pixels are arranged in practice.

In addition, the notation such as L0 and R1 shown in FIG. 4A and FIG. 4B indicates a position of a pixel of the left-eye image 60*l* and the right-eye image 60*r* in the horizontal direction. More specifically, the pixel L0 is a pixel located on the 0th column in the left-eye image 60*l* and the pixel R1 is a pixel located on the first column in the right-eye image 60*r*.

It is to be noted that the left-eye image 60*l* and the right-eye image 60*r* may be arranged in the checkered pattern on a per pixel basis, or may be arranged in the checkered pattern in units of plural pixels, such as a unit of pixel group of two×two pixels in columns and rows.

Figure 5A:
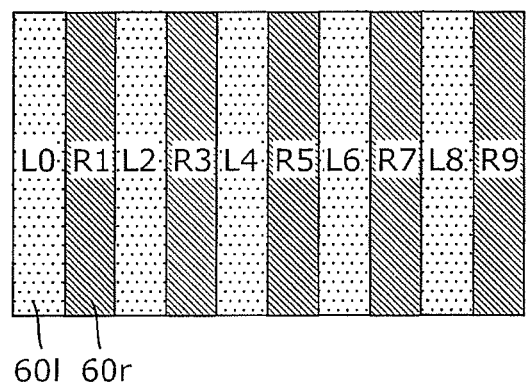
FIG. 5A is a diagram which shows an example of the arrangement pattern of the 3D image according to Embodiment 1 of the present invention.
Figure 5B:
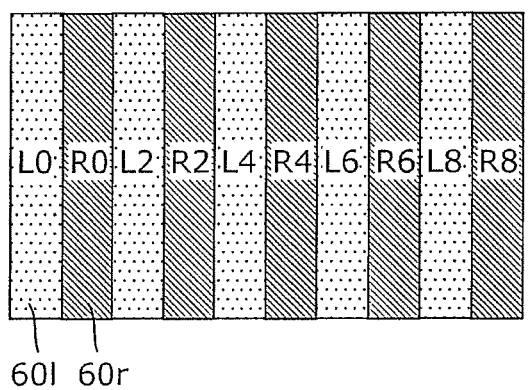
FIG. 5B is a diagram which shows an example of the arrangement pattern of the 3D image according to Embodiment 1 of the present invention.

In the arrangement patterns shown in FIG. 5A and FIG. 5B, the left-eye image 60*l* and the right-eye image 60*r* are arranged in a vertical stripe pattern. This arrangement pattern is hereinafter called a vertical interleave. It is to be noted that, the notation such as L0 and R1 shown in FIG. 5A and FIG. 5B indicates a position of a pixel of the left-eye image 60*l* and the right-eye image 60*r* in the horizontal direction. More specifically, the pixel L0 is a pixel located on the 0th column in the left-eye image 60*l* and the pixel R1 is a pixel located on the first column in the right-eye image 60*r*.

It is to be noted that the left-eye image 60*l* and the right-eye image 60*r* may be arranged alternately for each column or alternately for plural columns.

Figure 6A:
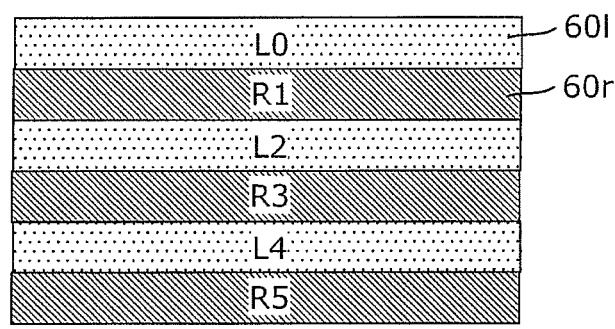
FIG. 6A is a diagram which shows an example of the arrangement pattern of the 3D image according to Embodiment 1 of the present invention.
Figure 6B:
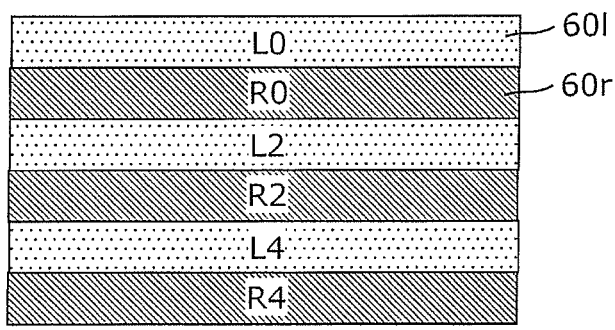
FIG. 6B is a diagram which shows an example of the arrangement pattern of the 3D image according to Embodiment 1 of the present invention.

In the arrangement patterns shown in FIG. 6A and FIG. 6B, the left-eye image 60*l* and the right-eye image 60*r* are arranged in a horizontal stripe pattern. This arrangement pattern is hereinafter called a line sequential. It is to be noted that, the notation such as L0 and R1 shown in FIG. 6A and FIG. 6B indicates a position of a pixel of the left-eye image 60*l* and the right-eye image 60*r* in the vertical direction. More specifically, the pixel L0 is a pixel located on the 0th row in the left-eye image 60*l* and the pixel R1 is a pixel located on the first row in the right-eye image 60*r*.

It is to be noted that the left-eye image 60*l* and the right-eye image 60*r* may be arranged alternately for each row or alternately for plural rows.

In addition, in the arrangement patterns shown in FIG. 2A to FIG. 6B described above, the left-eye image and the right-eye image may be inversely arranged.

Figure 7:
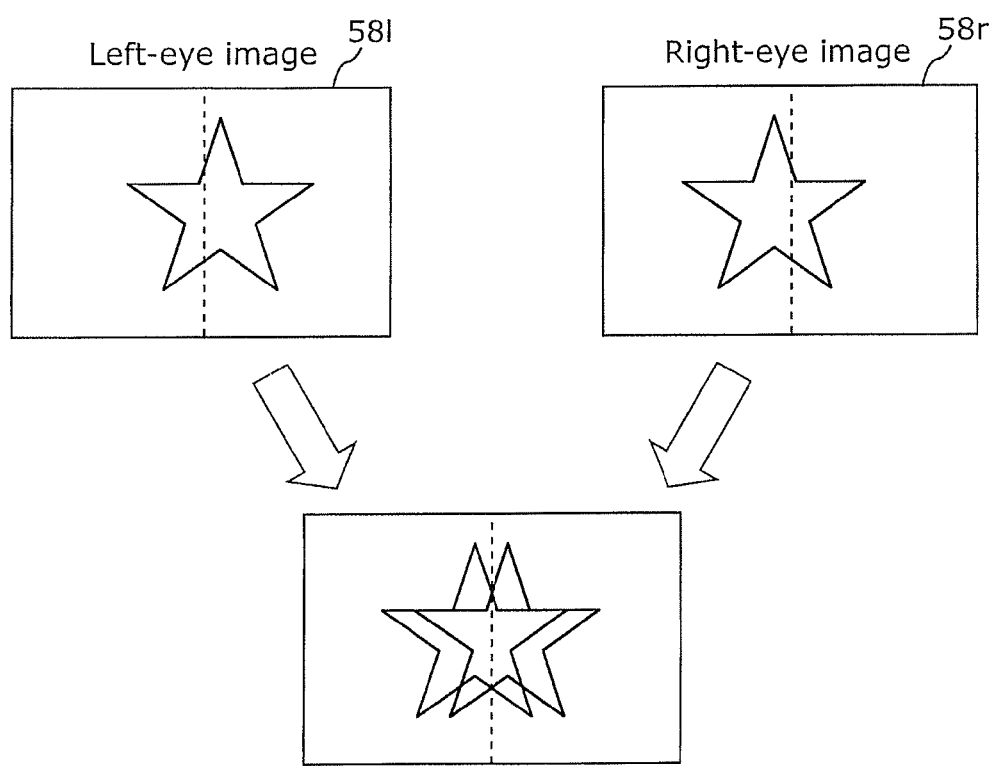
FIG. 7 is a diagram which shows an example of a left-eye image and a right-eye image according to Embodiment 1 of the present invention.

FIG. 7 is a diagram which shows an example of a left-eye image 58*l* and a right-eye image 58.

As shown in FIG. 7, an object included in the left-eye image 58*l* and the right-eye image 58*r* has a parallax according to a distance between a position of shooting and the object.

It is to be noted that, when performing the above-described format conversion in the 3D image processing apparatus 100B included in the digital video recorder 30, for example, the 3D image processing apparatus 100B converts the arrangement pattern of the input 3D image 52 into a predetermined arrangement pattern (checker pattern, for example), as shown in FIG. 2B, and into 120 p at the same time. In this case, the 3D image processing apparatus 100 included in the digital television 20 performs only the conversion of the arrangement pattern of the input 3D image 57 of 120 p; that is, conversion for arranging the left-eye image 58*l* and the right-eye image 58*r* alternately, for example.

It is to be noted that, the 3D image processing apparatus 100B may perform the format conversion shown in FIG. 2A instead of the 3D image processing apparatus 100. In addition, the 3D image processing apparatus 100B may perform part of the conversion of the arrangement pattern, the frame rate, the scanning scheme, and the image size, and the 3D image processing apparatus 100 may perform conversion other than the part of the conversion. Furthermore, processing performed by the 3D image processing apparatus 100 and processing performed by the 3D image processing apparatus 100B may partly be overlapped.

The following describes in detail the 3D image processing apparatus 100.

The 3D image processing apparatus 100 has a two-screen processing mode and a 3D image processing mode. With the two-screen processing mode, a synthesized image is generated which includes in a single screen (i) a main screen image that corresponds to a first image according to the present invention and (ii) a sub screen image that corresponds to a second image according to the present invention, each of which is a 2D image. With the 3D image processing mode, as described above, the input 3D image 56 or 57 of the first format is converted into the output 3D image 58 of the second format.

First, an outline of an operation performed by the 3D image processing apparatus 100 in the two-screen processing mode is described.

Figure 8:
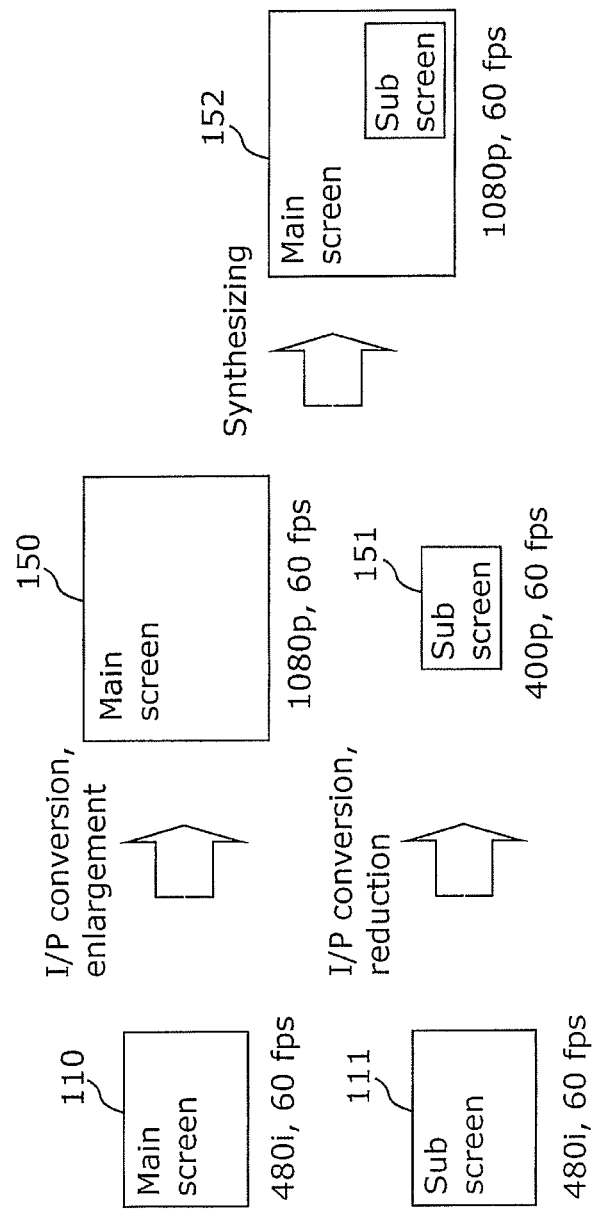
FIG. 8 is a diagram which shows an example of an operation in a two-screen processing mode performed by the 3D image processing apparatus according to Embodiment 1 of the present invention.

FIG. 8 is a diagram which shows an example of an operation in the two-screen processing mode performed by the 3D image processing apparatus 100.

As shown in FIG. 8, the 3D image processing apparatus 100, in the two-screen processing mode, generates a synthesized image in which a sub screen with a reduced size is overlapped on a main screen. It is to be noted that the details of the operation in the two-screen processing mode will be described later.

The following describes a configuration of the 3D image processing apparatus 100.

Figure 9:
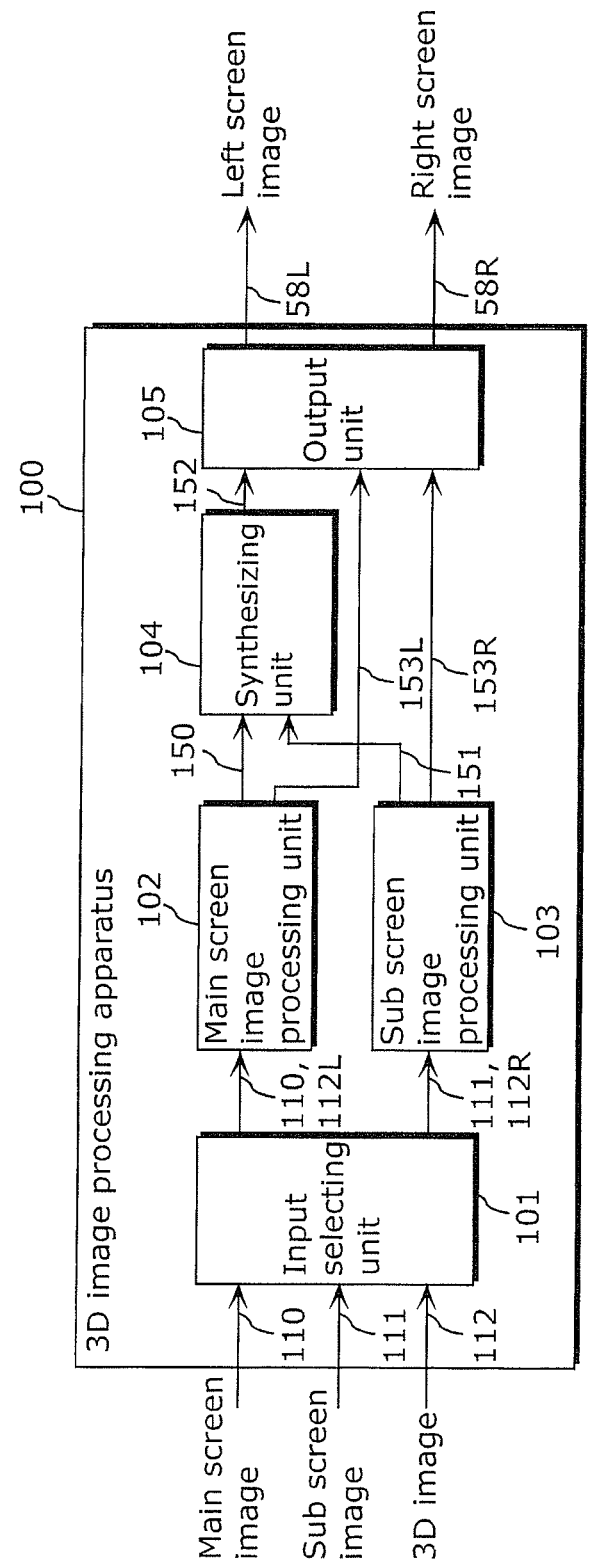
FIG. 9 is a block diagram which shows a configuration of a 3D image displaying apparatus according to Embodiment 1 of the present invention.

FIG. 9 is a block diagram which shows a configuration of the 3D image processing apparatus 100.

As shown in FIG. 9, the 3D image processing apparatus 100 includes: an input selecting unit 101; a main screen image processing unit 102; a sub screen image processing unit 103; a synthesizing unit 104; and an output unit 105.

The input selecting unit 101, in the two-screen processing mode, outputs a main screen image 110 to the main screen image processing unit 102 and outputs a sub screen image 111 to the sub screen image processing unit 103.

Furthermore, the input selecting unit 101, in the 3D image processing mode, divides a 3D image 112 into a left screen input image 112L and a right screen input image 112R, outputs the left screen input image 112L to the main screen image processing unit 102, and outputs the right screen input image 112R to the sub screen image processing unit 103.

It is to be noted that the input selecting unit 101, in the 3D image processing mode, may output the 3D image 112 to each of the main screen image processing unit 102 and the sub screen image processing unit 103, and then the main screen image processing unit 102 may extract the left screen input image 112L from the 3D image 112 and the sub screen image processing unit 103 may extract the right screen input image 112R from the 3D image 112.

Here, the main screen image 110 and the sub screen image 111 are 2D images different from each other. For example, the main screen image 110 and the sub screen image 111 are two of the following images: an image of a first channel included in the broadcast wave 42; an image of a second channel included in the broadcast wave 42; and an image obtained by the HDMI communication unit 23.

In addition, the 3D image 112 is one of the above-described input 3D image 56 and the input 3D image 57. Furthermore, the left screen input image 112L is a left half of an image of the 3D image 112 and the right screen input image 112R is a right half of an image of the 3D image 112, for example.

The main screen image processing unit 102 that corresponds to a first image processing unit according to the present invention, in the two-screen processing mode, converts the format of the main screen image 110 output from the input selecting unit 101, thereby generating a main screen processed image 150 that corresponds to a first processed image according to the present invention. In addition, the main screen image processing unit 102, in the 3D image processing mode, converts the format of the left screen input image 112L output from the input selecting unit 101, thereby generating a left screen output image 153L.

The sub screen image processing unit 103 that corresponds to a second image processing unit according to the present invention, in the two-screen processing mode, converts the format of the sub screen image 111 output from the input selecting unit 101, thereby generating a sub screen processed image 151 that corresponds to a second processed image according to the present invention. In addition, the sub screen image processing unit 103, in the 3D image processing mode, converts the format of the right screen input image 112R output from the input selecting unit 101, thereby generating a right screen output image 153R.

The synthesizing unit 104 combines the main screen processed image 150 generated by the main screen image processing unit 102 and the sub screen processed image 151 generated by the sub screen image processing unit 103, thereby synthesizing a synthesized image 152.

The output unit 105, in the two-screen processing mode, divides the synthesized image 152 generated by the synthesizing unit 104 into the left screen image 58L and the right screen image 58R. In addition, the output unit 105 outputs, to the left screen driving unit 24L, the left screen image 58L which is a result of the division, and outputs, to the right screen driving unit 24R, the right screen image 58R which is a result of the division.

Furthermore, the output unit 105, in the 3D image processing mode, outputs, to the left screen driving unit 24L, the left screen output image 153L generated by the main screen image processing unit 102 as the left screen image 58L, and outputs, to the right screen driving unit 24R, the right screen output image 153R generate by the sub screen image processing unit 103 as the right screen image 58R.

The following describes in detail a configuration of the main screen image processing unit 102 and the sub screen image processing unit 103.

Figure 10:
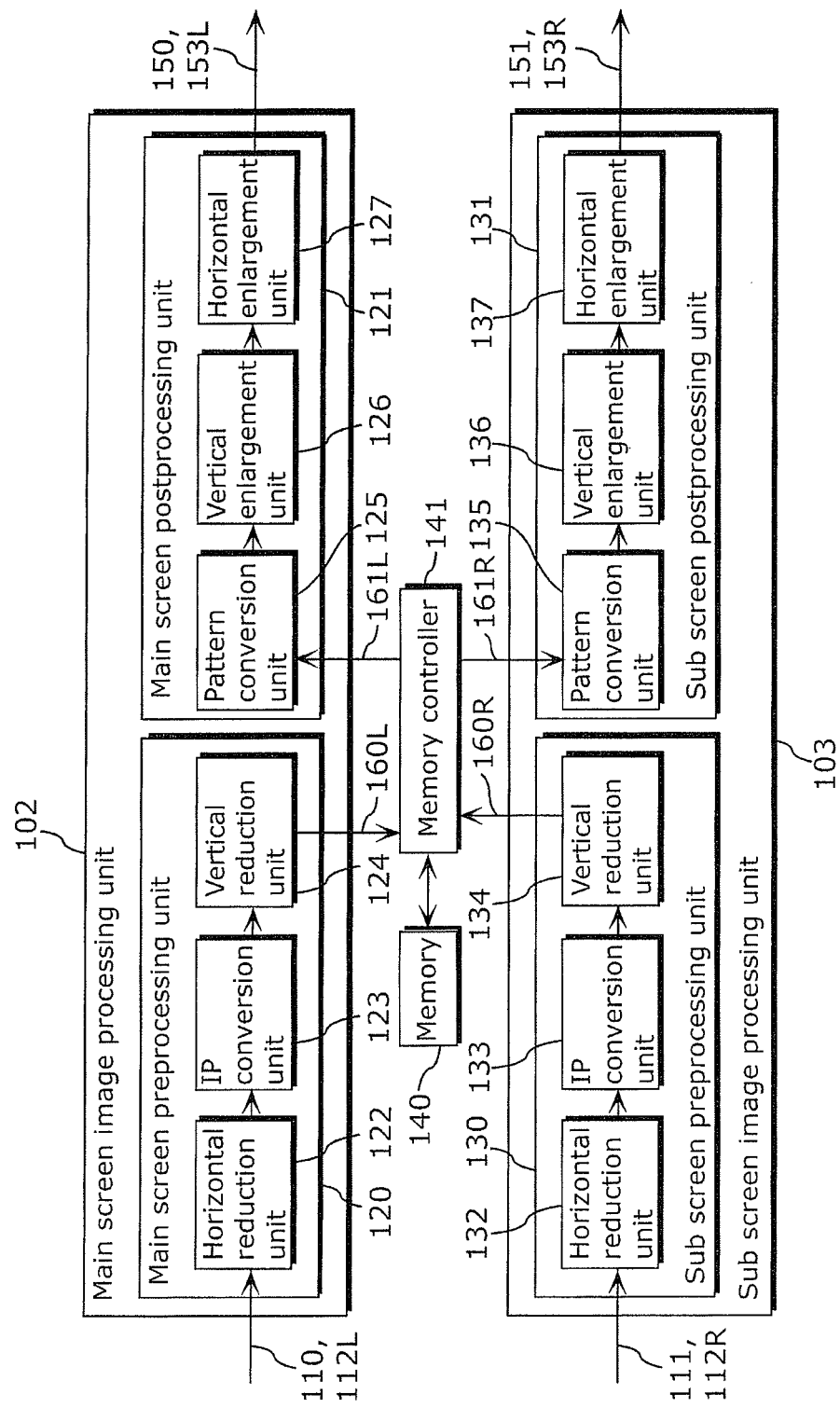
FIG. 10 is a block diagram which shows a configuration of a main screen image processing unit and a sub screen image processing unit according to Embodiment 1 of the present invention.

FIG. 10 is a block diagram which shows a configuration of the main screen image processing unit 102 and the sub screen image processing unit 103.

As shown in FIG. 10, the main screen image processing unit 102 includes a main screen preprocessing unit 120 and a main screen postprocessing unit 121. In addition, the 3D image processing apparatus 100 further includes a memory 140 and a memory controller 141.

The main screen preprocessing unit 120 that corresponds to a first preprocessing unit according to the present invention reduces an image size and converts the scanning scheme of the main screen image 110 or the left screen input image 112L, thereby generating a left screen processed image 160L that corresponds to a third processed image according to the present invention. The main screen preprocessing unit 120 includes: a horizontal reduction unit 122; an IP conversion unit 123; and a vertical reduction unit 124.

The horizontal reduction unit 122 reduces the image size of the main screen image 110 or the left screen input image 112L in the horizontal direction and then outputs the image.

The IP conversion unit 123 converts the scanning scheme of the image that has been output from the horizontal reduction unit 122 from the interlace scheme to the progressive scheme and outputs the image. This conversion is hereinafter referred to as "IP conversion". Here, the IP conversion is a process of interpolating pixels in rows that are not present in an image in the interlace scheme. In the IP conversion, for example, pixels in rows that are not present is interpolated using a neighboring pixel in the same field, or a same or neighboring pixel in a field which is temporally nearest or immediately subsequent and has a different field determining signal. In addition, a pixel to be used for interpolation is determined according to motion of the image. Furthermore, the field determining signal is a signal which indicates whether the field is a top field or a bottom field.

The vertical reduction unit 124 reduces, in the vertical direction, the image size of the image that has been output from the IP conversion unit 123, thereby generating and outputting the left screen processed image 160L.

In addition, as a method of reducing the image size, a method of thinning pixels, a method of calculating an average of plural pixels, or the like can be used.

It is to be noted that the order of processes performed by the horizontal reduction unit 122, the IP conversion unit 123, and the vertical reduction unit 124 shown in FIG. 10 is presented as an example, and the processes performed by each of the processing units may be carried out in an arbitrary order.

The memory controller 141 writes and reads data into and from the memory 140.

In addition, the main screen preprocessing unit 120 stores the generated left screen processed image 160L into the memory 140 via the memory controller 141.

The main screen postprocessing unit 121 that corresponds to a first postprocessing unit according to the present invention reads a left screen processed image 161L which corresponds to a fifth processed image according to the present invention and which includes at least one of the left screen processed image 160L and the right screen processed image 160R which are stored in the memory 140 via the memory controller 141. To be more specific, the left screen processed image 161L includes pixels that correspond to the left screen 26L of the display panel 26, among pixels included in the left screen processed image 160L and the right screen processed image 160R which are stored in the memory 140.

In addition, the main screen postprocessing unit 121 converts the arrangement pattern and the frame rate as well as enlarging the image size of the left screen processed image 161L, thereby generating the main screen processed image 150 or the left screen output image 153L. The main screen postprocessing unit 121 includes a pattern conversion unit 125, a vertical enlargement unit 126, and a horizontal enlargement unit 127.

The pattern conversion unit 125 converts the arrangement pattern and the frame rate of the left screen processed image 161L and then outputs the left screen processed image 161L. It is to be noted that the pattern conversion unit 125 may convert the arrangement pattern and the frame rate after reading the left screen processed image 161L, or may perform pattern conversion and frame rate conversion concurrently with reading, by reading pixels in an arrangement order at the time of reading the left screen processed image 161L.

The vertical enlargement unit 126 enlarges, in the vertical direction, the image size of the image that has been output from the pattern conversion unit 125 and outputs the image.

The horizontal enlargement unit 127 enlarges, in the horizontal direction, the image size of the image that has been output from the vertical enlargement unit 126 and outputs the image.

In addition, as a method of enlarging the image size, a method of simply copying pixels, or a method of interpolating pixels that are not present can be employed.

It is to be noted that the order of processes performed by the pattern conversion unit 125, the vertical enlargement unit 126, and the horizontal enlargement unit 127 shown in FIG. 10 is presented as an example, and the processes performed by each of the processing units may be carried out in an arbitrary order.

The following describes a configuration of the sub screen image processing unit 103. It is to be noted that the configuration of the sub screen image processing unit 103 is the same as that of the main screen image processing unit 102.

To be more specific, as shown in FIG. 10, the sub screen image processing unit 103 includes a sub screen preprocessing unit 130 and a sub screen postprocessing unit 131.

The sub screen preprocessing unit 130 that corresponds to a second preprocessing unit according to the present invention reduces the image size of the sub screen image 111 or the right screen input image 112R and performs IP conversion, thereby generating the right screen processed image 160R that corresponds to a fourth processed image according to the present invention. The sub screen preprocessing unit 130 includes: a horizontal reduction unit 132; an IP conversion unit 133; and a vertical reduction unit 134.

The horizontal reduction unit 132 reduces the image size of the sub screen image 100 or the right screen input image 112R in the horizontal direction and then outputs the image.

The IP conversion unit 133 performs IP conversion on the image that has been output from the horizontal reduction unit 132.

The vertical reduction unit 134 reduces, in the vertical direction, the image size of the image that has been output from the IP conversion unit 133, thereby generating and outputting the right screen processed image 160R.

It is to be noted that the order of processes performed by the horizontal reduction unit 132, the IP conversion unit 133, and the vertical reduction unit 134 shown in FIG. 10 is presented as an example, and the processes performed by each of the processing units may be carried out in an arbitrary order.

In addition, the sub screen preprocessing unit 130 stores the generated right screen processed image 160R into the memory 140 via the memory controller 141.

The sub screen postprocessing unit 131 that corresponds to a second postprocessing unit according to the present invention reads a right screen processed image 161R which corresponds to a sixth processed image according to the present invention and which includes at least one of the left screen processed image 160L and the right screen processed image 160R which are stored in the memory 140 via the memory controller 141. To be more specific, the right screen processed image 161R includes pixels that correspond to the right screen output image 153R (the right screen 26R corresponding to the display panel 26), among pixels included in the left screen processed image 160L and the right screen processed image 160R which are stored in the memory 140.

In addition, the sub screen postprocessing unit 131 converts the arrangement pattern and the frame rate as well as enlarging the image size of the right screen processed image 160R, thereby generating the sub screen processed image 151 or the right screen output image 153R. The sub screen postprocessing unit 131 includes a pattern conversion unit 135, a vertical enlargement unit 136, and a horizontal enlargement unit 137.

The pattern conversion unit 135 converts the arrangement pattern and the frame rate of the right screen processed image 161R and then outputs the right screen processed image 161R. It is to be noted that the pattern conversion unit 135 may convert the arrangement pattern and the frame rate after reading the right screen processed image 161R, or may perform pattern conversion and frame rate conversion concurrently with reading, by reading pixels in an arrangement order at the time of reading right screen processed image 161R.

The vertical enlargement unit 136 enlarges, in the vertical direction, the image size of the image that has been output from the pattern conversion unit 135 and outputs the image.

The horizontal enlargement unit 137 enlarges, in the horizontal direction, the image size of the image that has been output from the vertical enlargement unit 136 and outputs the image.

It is to be noted that the order of processes performed by the pattern conversion unit 135, the vertical enlargement unit 136, and the horizontal enlargement unit 137 shown in FIG. 10 is presented as an example, and the processes performed by each of the processing units may be carried out in an arbitrary order.

The following describes an operation example performed by the 3D image processing apparatus 100 configured in the above-described manner.

First, an operation example performed by the 3D image processing apparatus 100 in the two-screen processing mode is described.

It is assumed here that each of the main screen image 110 and the sub screen image 111 has the format of 480 i and a frame rate of 60 fps.

First, the input selecting unit 101 outputs a main screen image 110 to the main screen image processing unit 102 and outputs a sub screen image 111 to the sub screen image processing unit 103.

Next, the main screen image processing unit 102 performs IP conversion on the main screen image 110 as well as enlarging the image size from hi-vision to full hi-vision, thereby generating a main screen processed image 150 of 1080 p and 60 fps.

To be more specific, the IP conversion unit 123 performs IP conversion on the main screen image 110, thereby generating a converted image of 720 p and 60 fps. Next, the vertical enlargement unit 126 and the horizontal enlargement unit 127 enlarge the converted image, thereby generating the main screen processed image 150 of 1080p and 60 fps.

On the other hand, the sub screen image processing unit 103 converts the scanning scheme for the sub screen image 111 from the interlace scheme into the progressive scheme as well as reducing the image size, thereby generating the sub screen processed image 151 of 400 p and 60 fps, for example.

To be more specific, the horizontal reduction unit 132 reduces the image size of the sub screen image 111 in the horizontal direction, and the IP conversion unit 133 converts the scanning scheme of the reduced image from the interlace scheme to the progressive scheme, thereby generating the converted image of 720 p and 60 fps. Next, the vertical reduction unit 134 reduces the image size of the converted image in the vertical direction, thereby generating the sub screen processed image 151 of 400 p and 60 fps.

Next, the synthesizing unit 104 combines the main screen processed image 150 generated by the main screen image processing unit 102 and the sub screen processed image 151 generated by the sub screen image processing unit 103, thereby generating a synthesized image 152 of 1080 p and 60 fps.

Next, the output unit 105 divides the synthesized image 152 generated by the synthesizing unit 104 into the left screen image 58L and the right screen image 58R. In addition, the output unit 105 outputs, to the left screen driving unit 24L, the left screen image 58L which is a result of the division, and outputs, to the right screen driving unit 24R, the right screen image 58R which is a result of the division.

Through the processes described above, the 3D image processing apparatus 100 is capable of generating a synthesized image in which a sub screen with a reduced size is overlapped on a main screen.

It is to be noted that, when the image size of the main screen image 110 that has been input is larger than the image size that can be displayed by the display panel 26 (hereinafter referred to as a display image size), processing for reducing the image size is performed by the main screen image processing unit 102.

In addition, although an example of generating a synthesized image in which the sub screen is overlapped on the main screen is described here, a single screen may be divided into two sub screens to generate a synthesized image in which a main screen and a sub screen are arranged in the respective sub screens.

In this case, when the main screen image 110 is larger than the above-described sub screen, the main screen image processing unit 102 performs the processing for reducing the image size. It is to be noted that the 3D image processing apparatus 100 may generate, in the two-screen processing mode, a synthesized image in which the main screen and the sub screen are arranged in the respective sub screens which are results of the division, instead of generating a synthesized image in which the sub screen is overlapped on the main screen. Or, the 3D image processing apparatus 100 may include a mode in which a synthesized image in which the sub screen is overlapped on the main screen and a mode in which a synthesized image in which the main screen and the sub screen are arranged in the respective sub screens which are the results of the division.

In addition, irrespective of the image size of the main screen image 110 and the display image size of the display panel 26, the main screen postprocessing unit 121 may enlarge, after the main screen preprocessing unit 120 reduces the image size of the main screen image 110, the reduced image size so as to be the original image size. When the image size of the main screen image 110 is the same as the display image size of the display panel 26; that is, when the reduction or enlargement of the image size are not necessary, for example, the main screen preprocessing unit 120 may reduce the image size of the main screen image 110 to half in the vertical direction and the main screen postprocessing unit 121 may enlarge the reduced image size to double in the vertical direction.

With this, it is possible to reduce the amount of data to be stored in the memory 140, and thus the capacity of the memory 140 can be reduced. Furthermore, the processing amount of the IP conversion unit 123, the pattern conversion unit 125, and the like can be reduced.

It is to be noted that the sub screen postprocessing unit 131, irrespective of the image size of the sub screen image 111 and the display image size of the display panel 26, may enlarge, after the sub screen preprocessing unit 130 reduces the image size of the sub screen image 111, the reduced image size so as to be the original image size, in the same manner as in the main screen image processing unit 102.

In addition, the main screen image processing unit 102 and the sub screen image processing unit 103 may perform processing for increasing or decreasing the frame rate.

It is to be noted that the 3D image processing apparatus 100 has a normal mode in which only a single normal image is displayed in a single screen, in addition to the two-screen processing mode and the 3D image processing mode. In the normal mode, the main screen image processing unit 102 performs the format conversion on the single image.

Next, an operation example performed by the 3D image processing apparatus 100 in the 3D image processing mode is described.

FIGS. 11 to 16 are diagrams which show operation examples performed by the 3D image processing apparatus 100 in the 3D image processing mode.

Figure 11:
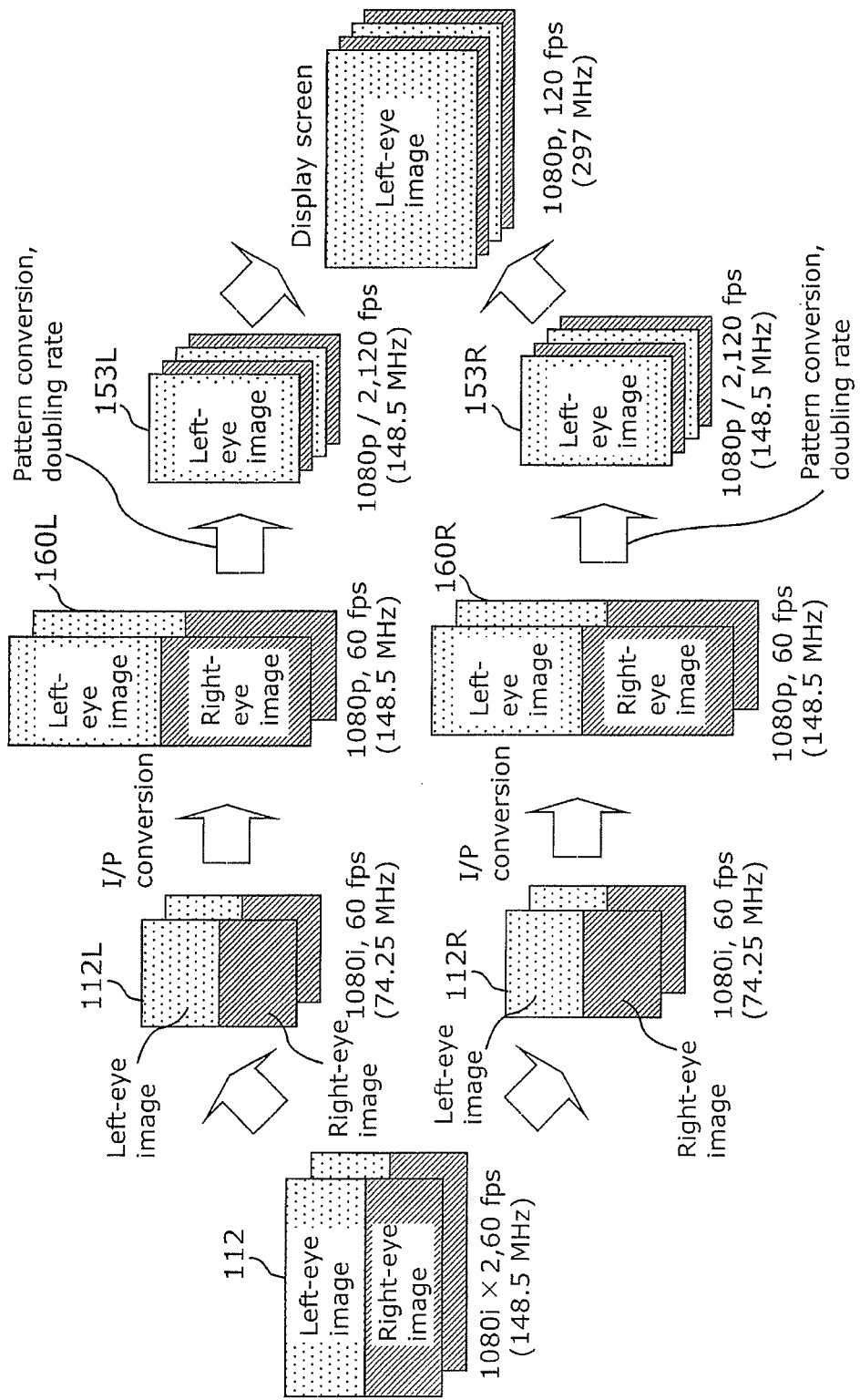
FIG. 11 is a diagram which shows an example of an operation in a 3D image processing mode performed by the 3D image processing apparatus according to Embodiment 1 of the present invention.

Here, in the example shown in FIG. 11, the 3D image 112 is an image of the frame sequential of a full-sized 1080 i and 60 fps. More specifically, the 3D image 112 includes, in one field, a left-eye image 60l of 1080 i (1920 columns×540 rows) and a right-eye image 60r of 1080 i (1920 columns×540 rows).

In other words, a dot clock of the 3D image 112 is 148.5 MHz. Here, the dot clock is a value generally represented by a product of an image size (the number of rows×the number of columns) and a frame rate. This means that the higher the dot clock is, the shorter the amount of time which can be used for processing one pixel. In other words, a data amount to be processed per unit time is large.

In addition, an image of 1080 p and 120 fps, in which the left-eye image 60l and the right-eye image 60r are alternately arranged, is displayed on the display panel 26.

In this case, the input selecting unit 101 first divides the 3D image 112 into the left screen input image 112L and the right screen input image 112R, outputs the left screen input image 112L to the main screen image processing unit 102, and outputs the right screen input image 112R to the sub screen image processing unit 103.

Here, each of the left screen input image 112L and the right screen input image 112R is half the size of the 3D image 112. Accordingly, the dot clock of each of the left screen input image 112L and the right screen input image 112R is 74.25 MHz that is a half of the dot clock of the 3D image 112.

More specifically, the left screen input image 112L includes, in one field, a left-eye image 60*l* of 1080 i/2 (960 columns×540 rows) and a right-eye image 60*r* of 1080 i/2 (960 columns×540 rows). In addition, the right screen input image 112R includes, in one field, a left-eye image 60*l* of 1080 i/2 (960 columns×540 rows) and a right-eye image 60*r* of 1080 i/2 (960 columns×540 rows).

More specifically, each of the left screen input image 112L and the right screen input image 112R has an image size of 960 columns×1080 rows.

Next, the main screen preprocessing unit 120 performs IP conversion on the left screen input image 112L, thereby generating a left screen processed image 160L of 1080 p and 60 fps. This IP conversion doubles the image size in the vertical direction. Accordingly, the dot clock of the left screen processed image 160L is 148.5 MHz that is a double of the dot clock of the left screen input image 112L.

More specifically, the left screen processed image 160L includes, in one frame, a left-eye image 60*l* of 1080 p/2 (960 columns×1080 rows) and the right-eye image 60*r* of 1080 p/2 (960 columns×1080 rows). Thus, the image size of the left screen processed image 160L is 960 columns×2160 rows.

Next, the main screen preprocessing unit 120 stores the left screen processed image 160L into the memory 140 via the memory controller 141.

Next, the main screen postprocessing unit 121 reads the left screen processed image 160L via the memory controller 141. At this time, the main screen postprocessing unit 121 performs pattern conversion and doubling rate on the left screen processed image 160L, thereby generating a left screen output image 153L of 1080 p/2 (960 columns×1080 rows) and 120 fps, in which the left-eye image 60*l* and the right-eye image 60*r* are alternately arranged. This pattern conversion halves the image size and the doubling rate doubles the frame rate. Accordingly, the dot clock of the left screen output image 153L is 148.5 MHz that is the same as the dot clock of the left screen processed image 160L.

On the other hand, the sub screen image processing unit 103 performs, on the right screen input image 112R, the same processing as that performed by the main screen image processing unit 102.

To be more specific, the sub screen preprocessing unit 130 performs IP conversion on the right screen input image 112R, thereby generating a right screen processed image 160R of 1080 p and 60 fps. This IP conversion doubles the image size in the vertical direction. Accordingly, the dot clock of the right screen processed image 160R is 148.5 MHz that is a double of the dot clock of the right screen input image 112R.

More specifically, the right screen processed image 160R includes, in one frame, a left-eye image 60*l* of 1080 p/2 (960 columns×1080 rows) and the right-eye image 60*r* of 1080 p/2 (960 columns×1080 rows). Thus, the image size of the right screen processed image 160R is 960 columns×2160 rows.

Next, the sub screen preprocessing unit 130 stores the right screen processed image 160R into the memory 140 via the memory controller 141.

Next, the sub screen postprocessing unit 131 reads the right screen processed image 160R via the memory controller 141. At this time, the sub screen postprocessing unit 131 performs pattern conversion and doubling rate on the right screen processed image 160R, thereby generating a right screen output image 153R of 1080 p/2 (960 columns×1080 rows) and 120 fps, in which the left-eye image 60*l* and the right-eye image 60*r* are alternately arranged. This pattern conversion halves the image size and the doubling rate doubles the frame rate. Accordingly, the dot clock of the right screen output image 153R is 148.5 MHz that is the same as the dot clock of the right screen processed image 160R.

Next, the output unit 105 outputs, to the left screen driving unit 24L, the left screen output image 153L generated by the main screen image processing unit 102 as the left screen image 58L, and outputs, to the right screen driving unit 24R, the right screen output image 153R generate by the sub screen image processing unit 103 as the right screen image 58R.

Next, the left screen driving unit 24L displays the left screen image 58L on the left screen 26L of the display panel 26. In addition, the right screen driving unit 24R displays the right screen image 58R on the right screen 26R of the display panel 26.

Through the processes described above, an image of a total of 1080 p and 120 fps, in which the left screen image 58L and the right screen image 58R are included, is displayed on the display panel 26. That means that the dot clock of the image displayed on the display panel 26 is 297 MHz.

As described above, in the 3D image processing apparatus 100 according to Embodiment 1 of the present invention, each of the main screen image processing unit 102 and the sub screen image processing unit 103 processes an image having a dot clock of a maximum of 148.5 MHz, thereby making it possible to generate an image having a dot clock of 297 MHz.

The following describes an operation example in the case where the 3D image 112 is an image of 720p.

Figure 12:
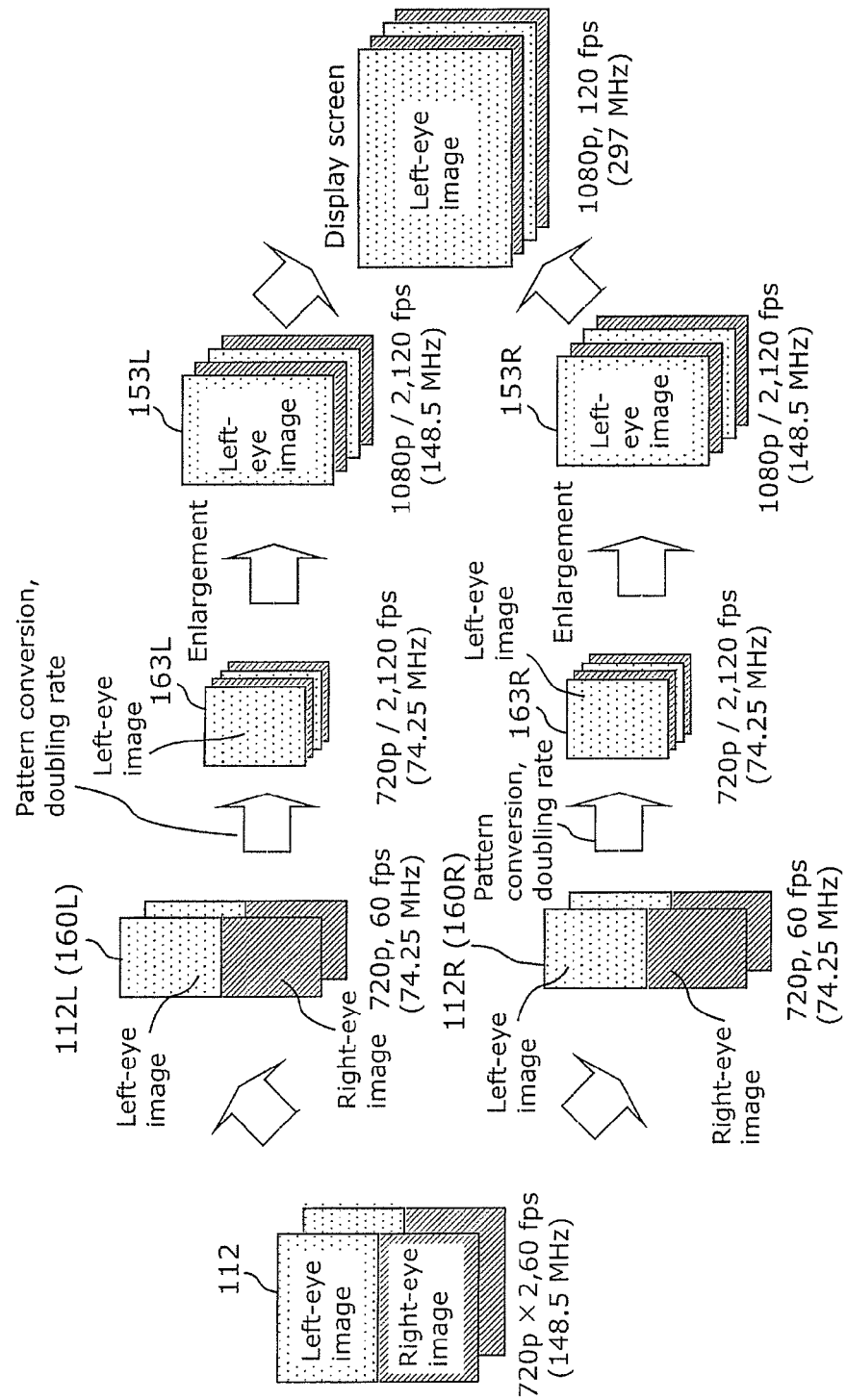
FIG. 12 is a diagram which shows an example of an operation in the 3D image processing mode performed by the 3D image processing apparatus according to Embodiment 1 of the present invention.

To be more specific, in the example shown in FIG. 12, the 3D image 112 is a full-sized image of the frame sequential of 720 p and 60 fps. That means that the 3D image 112 includes, in one frame, a left-eye image 60*l* of 720 p (1270 columns× 720 rows) and a right-eye image 60*r* of 720 p (1270 columns× 720 rows). In other words, a dot clock of the 3D image 112 is 148.5 MHz.

In addition, an image having 1080 p and 120 fps, in which the left-eye image 60*l* and the right-eye image 60*r* are alternately arranged, is displayed on the display panel 26.

In this case, the input selecting unit 101 first divides the 3D image 112 into the left screen input image 112L and the right screen input image 112R, outputs the left screen input image 112L to the main screen image processing unit 102, and outputs the right screen input image 112R to the sub screen image processing unit 103.

Here, the image size of each of the left screen input image 112L and the right screen input image 112R is a half of the image size of the 3D image 112. Accordingly, the dot clock of each of the left screen input image 112L and the right screen input image 112R is 74.25 MHz that is a half of the dot clock of the 3D image 112.

More specifically, the left screen input image 112L includes, in one frame, a left-eye image 60*l* of 720 p/2 (635 columns×720 rows) and a right-eye image 60*r* of 720 p/2 (635 columns×720 rows). In addition, the right screen input image 112R includes, in one frame, a left-eye image 60*l* of 720 p/2 (635 columns×720 rows) and a right-eye image 60*r* of 720 p/2 (635 columns×720 rows).

More specifically, each of the left screen input image 112L and the right screen input image 112R has an image size of 635 columns×1440 rows.

Next, the main screen preprocessing unit 120 stores the left screen input image 112L (left screen processed image 160L) into the memory 140 via the memory controller 141.

Next, the main screen postprocessing unit 121 reads the left screen processed image 160L via the memory controller 141. At this time, the main screen postprocessing unit 121 performs pattern conversion and doubling rate on the left screen processed image 160L, thereby generating a left screen processed image 163L of 720 p/2 (635 columns×720 rows) and 120 fps, in which the left-eye image 60*l* and the right-eye image 60*r* are alternately arranged. This pattern conversion halves the image size and the doubling rate doubles the frame rate. Accordingly, the dot clock of the left screen processed image 163L is 74.25 MHz that is the same as the dot clock of the left screen processed image 160L.

Next, the main screen postprocessing unit 121 enlarges the image size of the left screen processed image 163L, thereby generating a left screen output image 153L having 1080 p/2 (960 columns×1080 rows) and 120 fps, in which the left-eye image 60*l* and the right-eye image 60*r* are alternately arranged. This enlargement processing doubles the image size. Accordingly, the dot clock of the left screen output image 153L is 148.5 MHz that is a double of the dot clock of the left screen processed image 163L.

On the other hand, the sub screen image processing unit 103, in the same manner as in the main screen image processing unit 102, performs pattern conversion and doubling rate on the right screen processed image 160R, thereby generating a right screen processed image 163R of 720 p/2 (635 columns×720 rows) and 120 fps, in which the left-eye image 60*l* and the right-eye image 60*r* are alternately arranged. Next, the sub screen postprocessing unit 131 enlarges the image size of the right screen processed image 163R, thereby generating a right screen output image 153R of 1080 p/2 (960 columns×1080 rows) and 120 fps.

Next, the output unit 105 outputs, to the left screen driving unit 24L, the left screen output image 153L generated by the main screen image processing unit 102 as the left screen image 58L, and outputs, to the right screen driving unit 24R, the right screen output image 153R generate by the sub screen image processing unit 103 as the right screen image 58R.

Next, the left screen driving unit 24L displays the left screen image 58L on the left screen 26L of the display panel 26. In addition, the right screen driving unit 24R displays the right screen image 58R on the right screen 26R of the display panel 26.

Through the processes described above, an image of a total of 1080 p and 120 fps, in which the left screen image 58L and the right screen image 58R are included, is displayed on the display panel 26. That means that the dot clock of the image displayed on the display panel 26 is 297 MHz.

Figure 13:
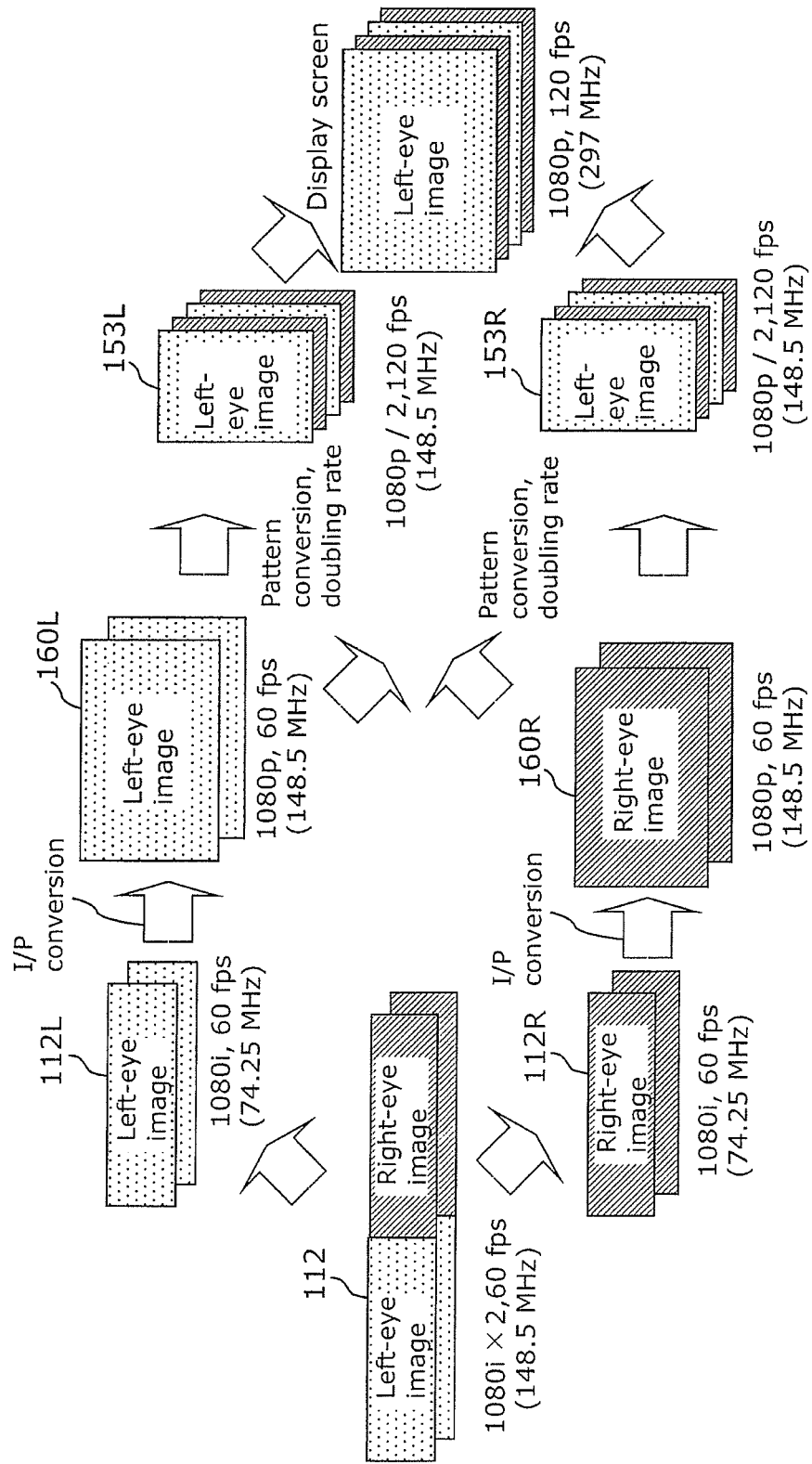
FIG. 13 is a diagram which shows an example of an operation in the 3D image processing mode performed by the 3D image processing apparatus according to Embodiment 1 of the present invention.
Figure 14:
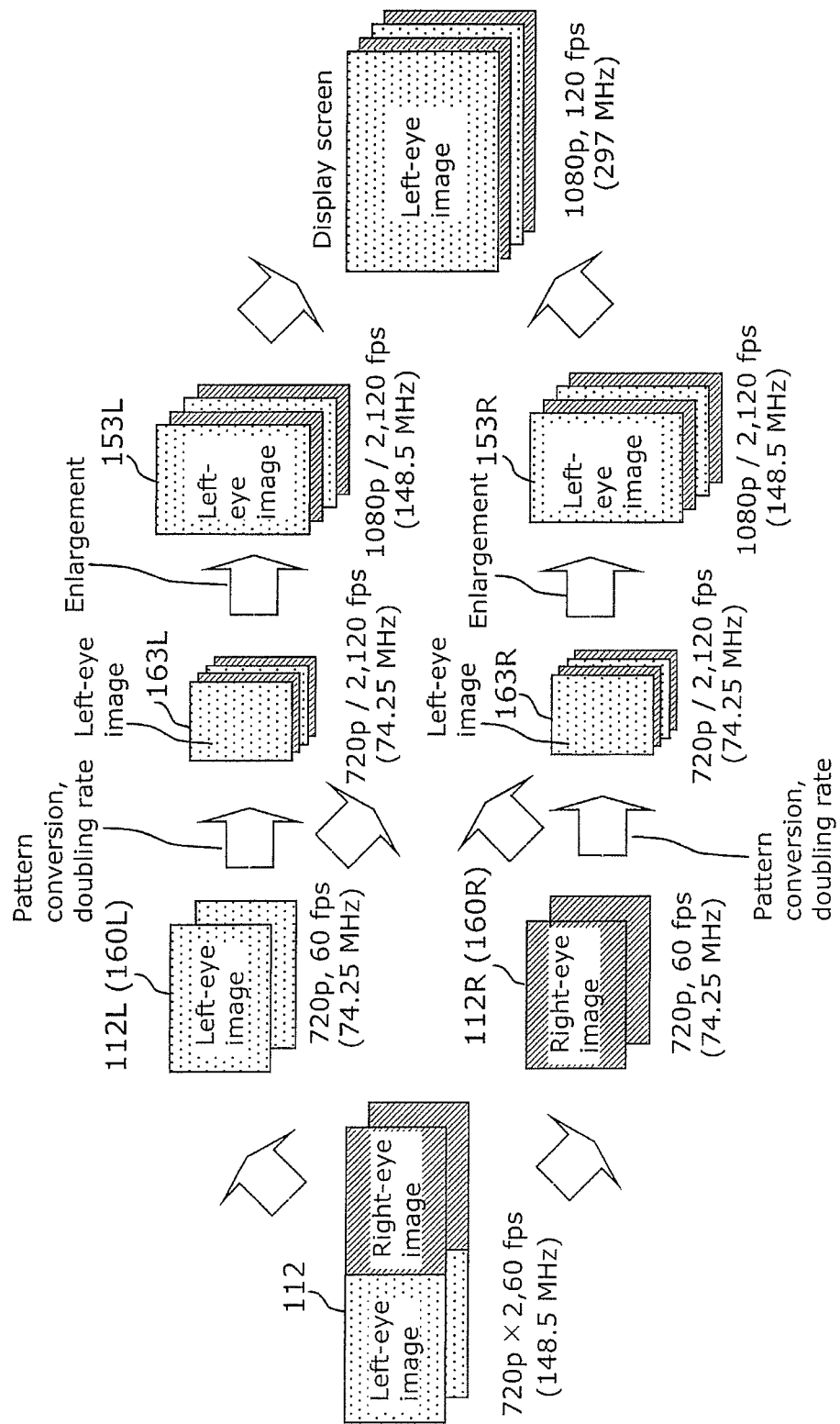
FIG. 14 is a diagram which shows an example of an operation in the 3D image processing mode performed by the 3D image processing apparatus according to Embodiment 1 of the present invention.

The following describes, with reference to FIG. 13 and FIG. 14, an operation example in the case where the arrangement pattern of the 3D image 112 is the side by side.

In the operation example shown in FIG. 13 and FIG. 14, following points are primarily different from the above-described operation example shown in FIG. 11 and FIG. 12. In the operation example shown in FIG. 13 and FIG. 14, the main screen postprocessing unit 121 cannot generate the left screen output image 153L using only the left screen processed image 160L generated by the main screen preprocessing unit 120. Accordingly, the main screen postprocessing unit 121 generates the left screen output image 153L using the left screen processed image 160L generated by the main screen preprocessing unit 120 and the right screen processed image 160R generated by the sub screen preprocessing unit 130.

Likewise, the sub screen postprocessing unit 131 cannot generate the right screen output image 153R using only the right screen processed image 160R generated by the sub screen preprocessing unit 130. Accordingly, the sub screen postprocessing unit 131 generates the right screen output image 153R using the left screen processed image 160L generated by the main screen preprocessing unit 120 and the right screen processed image 160R generated by the sub screen preprocessing unit 130.

To be more specific, in the example shown in FIG. 13, the 3D image 112 is a full-sized image of the side by side and a 1080 i and 60 fps. More specifically, the 3D image 112 includes, in one field, a left-eye image 60*l* of 1080 i (1920 columns×540 rows) and a right-eye image 60*r* of 1080 i (1920 columns×540 rows). In other words, a dot clock of the 3D image 112 is 148.5 MHz.

In addition, an image of 1080 p and 120 fps, in which the left-eye image 60*l* and the right-eye image 60*r* are alternately arranged, is displayed on the display panel 26.

In this case, the input selecting unit 101 first divides the 3D image 112 into the left screen input image 112L and the right screen input image 112R, outputs the left screen input image 112L to the main screen image processing unit 102, and outputs the right screen input image 112R to the sub screen image processing unit 103.

Here, the image size of each of the left screen input image 112L and the right screen input image 112R is a half of the image size of the 3D image 112. Accordingly, the dot clock of each of the left screen input image 112L and the right screen input image 112R is 74.25 MHz that is a half of the dot clock of the 3D image 112.

More specifically, the left screen input image 112L includes, in one field, a left-eye image 60*l* of 1080 i (1920 columns×540 rows). In addition, the right screen input image 112R includes, in one field, a right-eye image 60*r* of 1080 i (1920 columns×540 rows). Thus, each of the left screen input image 112L and the right screen input image 112R has an image size of 1920 columns×540 rows.

Next, the main screen preprocessing unit 120 performs IP conversion on the left screen input image 112L, thereby generating a left screen processed image 160L of 1080 p and 60 fps. This IP conversion doubles the image size in the vertical direction. Accordingly, the dot clock of the left screen processed image 160L is 148.5 MHz that is a double of the dot clock of the left screen input image 112L.

More specifically, the left screen processed image 160L includes, in one frame, a left-eye image 60*l* of 1080 p (1920 columns×1080 rows). Thus, the image size of the left screen processed image 160L is 1920 columns×1080 rows.

Next, the main screen preprocessing unit 120 stores the left screen processed image 160L into the memory 140 via the memory controller 141.

On the other hand, the sub screen preprocessing unit 130 performs IP conversion on the right screen input image 112R, thereby generating a right screen processed image 160R of 1080 p and 60 fps. This IP conversion doubles the image size in the vertical direction. Accordingly, the dot clock of the right screen processed image 160R is 148.5 MHz that is a double of the dot clock of the right screen input image 112R.

More specifically, the right screen processed image 160R includes, in one frame, a right-eye image 60*r* of 1080 p (1920 columns×1080 rows). Thus, the image size of the right screen processed image 160R is 1920 columns×1080 rows.

Next, the sub screen preprocessing unit 130 stores the right screen processed image 160R into the memory 140 via the memory controller 141.

Next, the main screen postprocessing unit 121 reads, via the memory controller 141, the left screen processed image 160L that includes plural pixels corresponding to the left screen 26L of the display panel 26, among plural pixels included in the left screen processed image 160L and the right screen processed image 160R. In addition, the main screen postprocessing unit 121 performs pattern conversion and doubling rate on the left screen processed image 161L, thereby generating a left screen output image 153L of 1080 p/2 (960 columns×1080 rows) and 120 fps, in which the left-eye image 60l and the right-eye image 60r are alternately arranged.

To be more specific, the main screen postprocessing unit 121 reads a left half of the left screen processed image 160L and a left half of the right screen processed image 160R and arrange alternately the left half of the left screen processed image 160L and the left half of the right screen processed image 160R which have been read, thereby generating a left screen output image 153L.

This pattern conversion halves the image size and the doubling rate doubles the frame rate. Accordingly, the dot clock of the left screen output image 153L is 148.5 MHz that is the same as the dot clock of the left screen processed image 160L.

On the other hand, the sub screen postprocessing unit 131 reads, via the memory controller 141, the right screen processed image 160R that includes plural pixels corresponding to the right screen 26R of the display panel 26, among plural pixels included in the left screen processed image 160L and the right screen processed image 160R, in the same manner as in the main screen postprocessing unit 131. In addition, the sub screen postprocessing unit 131 performs pattern conversion and doubling rate on the right screen processed image 161R, thereby generating a right screen output image 153R of 1080 p/2 (960 columns×1080 rows) and 120 fps, in which the left-eye image 60l and the right-eye image 60r are alternately arranged.

To be more specific, the sub screen postprocessing unit 131 reads a right half of the left screen processed image 160L and a right half of the right screen processed image 160R and arrange alternately the right half of the left screen processed image 160L and the right half of the right screen processed image 160R which have been read, thereby generating a right screen output image 153R.

This pattern conversion halves the image size and the doubling rate doubles the frame rate. Accordingly, the dot clock of the right screen output image 153R is 148.5 MHz that is the same as the dot clock of the left screen processed image 160L.

Next, the output unit 105 outputs, to the left screen driving unit 24L, the left screen output image 153L generated by the main screen image processing unit 102 as the left screen image 58L, and outputs, to the right screen driving unit 24R, the right screen output image 153R generate by the sub screen image processing unit 103 as the right screen image 58R.

Next, the left screen driving unit 24L displays the left screen image 58L on the left screen 26L of the display panel 26. In addition, the right screen driving unit 24R displays the right screen image 58R on the right screen 26R of the display panel 26.

Through the processes described above, an image of a total of 1080 p and 120 fps, in which the left screen image 58L and the right screen image 58R are included, is displayed on the display panel 26. That means that the dot clock of the image displayed on the display panel 26 is 297 MHz.

Next, an operation example shown in FIG. 14 is described.

Here, in the example shown in FIG. 14, the 3D image 112 is a full-sized image of the side by side and 720 p and 60 fps. That means that the 3D image 112 includes, in one frame, a left-eye image 60l of 720 p (1270 columns×720 rows) and a right-eye image 60r of 720 p (1270 columns×720 rows). In other words, a dot clock of the 3D image 112 is 148.5 MHz.

In addition, an image of 1080 p and 120 fps, in which the left-eye image 60l and the right-eye image 60r are alternately arranged, is displayed on the display panel 26.

In this case, the input selecting unit 101 first divides the 3D image 112 into the left screen input image 112L and the right screen input image 112R, outputs the left screen input image 112L to the main screen image processing unit 102, and outputs the right screen input image 112R to the sub screen image processing unit 103.

Here, the image size of each of the left screen input image 112L and the right screen input image 112R is a half of the image size of the 3D image 112. Accordingly, the dot clock of each of the left screen input image 112L and the right screen input image 112R is 74.25 MHz that is a half of the dot clock of the 3D image 112.

More specifically, the left screen input image 112L includes, in one frame, a left-eye image 60l of 720 p (1270 columns×720 rows). In addition, the right screen input image 112R includes, in one frame, a right-eye image 60r of 720 p (1270 columns×720 rows). Thus, each of the left screen input image 112L and the right screen input image 112R has an image size of 1270 columns×720 rows.

Next, the main screen preprocessing unit 120 stores the left screen input image 112L (left screen processed image 160L) into the memory 140 via the memory controller 141.

On the other hand, the sub screen preprocessing unit 130 stores the right screen input image 112R (right screen processed image 160R) into the memory 140 via the memory controller 141.

Next, the main screen postprocessing unit 121 reads, via the memory controller 141, the left screen processed image 161L that includes plural pixels corresponding to the left screen 26L of the display panel 26, among plural pixels included in the left screen processed image 160L and the right screen processed image 160R. In addition, the main screen postprocessing unit 121 performs pattern conversion and doubling rate on the left screen processed image 161L, thereby generating a left screen processed image 163L of 720 p/2 (635 columns×720 rows) and 120 fps, in which the left-eye image 60l and the right-eye image 60r are alternately arranged.

To be more specific, the main screen postprocessing unit 121 reads a left half of the left screen processed image 160L and a left half of the right screen processed image 160R and arrange alternately the left half of the left screen processed image 160L and the left half of the right screen processed image 160R which have been read, thereby generating a left screen output image 153L.

This pattern conversion halves the image size and the doubling rate doubles the frame rate. Accordingly, the dot clock of the left screen processed image 163L is 74.25 MHz that is the same as the dot clock of the left screen processed image 160L.

Next, the main screen postprocessing unit 121 enlarges the image size of the left screen processed image 163L, thereby generating a left screen output image 153L of 1080 p/2 (960 columns×1080 rows) and 120 fps, in which the left-eye image 60l and the right-eye image 60r are alternately arranged. This enlargement processing doubles the image size. Accordingly, the dot clock of the left screen output image 153L is 148.5 MHz that is a double of the dot clock of the left screen processed image 163L.

On the other hand, the sub screen postprocessing unit 131 performs the same processing as the processing performed by the main screen postprocessing unit 121, thereby generating a right screen output image 153R of 1080 p/2 (960 columns×1080 rows) and 120 fps, in which the left-eye image 60*l* and the right-eye image 60*r* are alternately arranged.

Next, the output unit 105 outputs, to the left screen driving unit 24L, the left screen output image 153L generated by the main screen image processing unit 102 as the left screen image 58L, and outputs, to the right screen driving unit 24R, the right screen output image 153R generate by the sub screen image processing unit 103 as the right screen image 58R.

Next, the left screen driving unit 24L displays the left screen image 58L on the left screen 26L of the display panel 26. In addition, the right screen driving unit 24R displays the right screen image 58R on the right screen 26R of the display panel 26.

Through the processes described above, an image of a total of 1080 p and 120 fps, in which the left screen image 58L and the right screen image 58R are included, is displayed on the display panel 26. That means that the dot clock of the image displayed on the display panel 26 is 297 MHz.

Figure 15:
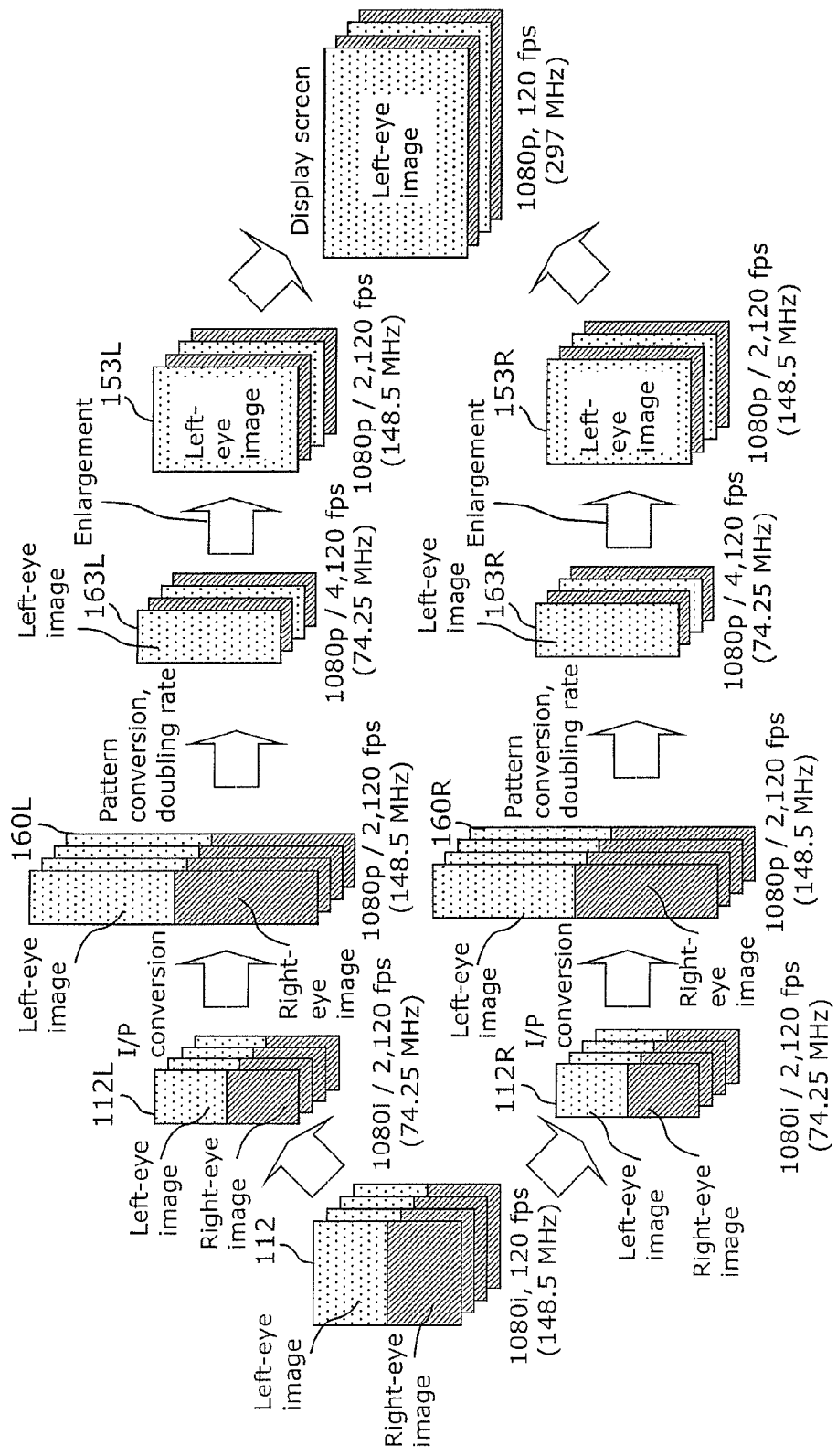
FIG. 15 is a diagram which shows an example of an operation in the 3D image processing mode performed by the 3D image processing apparatus according to Embodiment 1 of the present invention.

The following describes, with reference to FIG. 15, an operation example in the case where the 3D image 112 has a frame rate of 120 fps.

To be more specific, in the example shown in FIG. 15, the 3D image 112 is an image of the frame sequential of 1080 i and 120 fps. More specifically, the 3D image 112 includes, in one field, a left-eye image 60*l* of 1080 i (1920 columns×540 rows) and a right-eye image 60*r* of 1080 i (1920 columns×540 rows). In other words, a dot clock of the 3D image 112 is 148.5 MHz.

In addition, an image of 1080 p and 120 fps, in which the left-eye image 60*l* and the right-eye image 60*r* are alternately arranged, is displayed on the display panel 26.

In this case, the input selecting unit 101 first divides the 3D image 112 into the left screen input image 112L and the right screen input image 112R, outputs the left screen input image 112L to the main screen image processing unit 102, and outputs the right screen input image 112R to the sub screen image processing unit 103.

Here, the image size of each of the left screen input image 112L and the right screen input image 112R is a half of the image size of the 3D image 112. Accordingly, the dot clock of each of the left screen input image 112L and the right screen input image 112R is 74.25 MHz that is a half of the dot clock of the 3D image 112.

More specifically, the left screen input image 112L includes, in one field, a left-eye image 60*l* of 1080 i/2 (960 columns×540 rows) and a right-eye image 60*r* of 1080 i/2 (960 columns×540 rows). In addition, the right screen input image 112R includes, in one field, a left-eye image 60*l* of 1080 i/2 (960 columns×540 rows) and a right-eye image 60*r* of 1080 i/2 (960 columns×540 rows).

More specifically, each of the left screen input image 112L and the right screen input image 112R has an image size of 480 columns×1080 rows.

Next, the main screen preprocessing unit 120 performs IP conversion on the left screen input image 112L, thereby generating a left screen processed image 160L having 1080 p/2 and 120 fps. This IP conversion doubles the image size in the vertical direction. Accordingly, the dot clock of the left screen processed image 160L is 148.5 MHz that is a double of the dot clock of the left screen input image 112L.

More specifically, the left screen processed image 160L includes, in one frame, a left-eye image 60*l* of 1080 p/2 (960 columns×1080 rows) and the right-eye image 60*r* of 1080 p/2 (960 columns×1080 rows). Thus, the image size of the left screen processed image 160L is 960 columns×2160 rows.

Next, the main screen preprocessing unit 120 stores the left screen processed image 160L into the memory 140 via the memory controller 141.

Next, the main screen postprocessing unit 121 reads the left screen processed image 160L via the memory controller 141. At this time, the main screen postprocessing unit 121 performs pattern conversion on the left screen processed image 160L, thereby generating a left screen processed image 163L of 1080 p/2 (960 columns×1080 rows) and 120 fps, in which the left-eye image 60*l* and the right-eye image 60*r* are alternately arranged.

This pattern conversion reduces the image size to half. Accordingly, the dot clock of the left screen output image 153L is 74.25 MHz that is a half of the dot clock of the left screen processed image 160L.

Next, the main screen postprocessing unit 121 enlarges the image size of the left screen processed image 163L, thereby generating a left screen output image 153L having 1080 p/2 (960 columns×1080 rows) and 120 fps, in which the left-eye image 60*l* and the right-eye image 60*r* are alternately arranged. This enlargement processing doubles the image size. Accordingly, the dot clock of the left screen output image 153L is 148.5 MHz that is a double of the dot clock of the left screen processed image 163L.

On the other hand, the sub screen image processing unit 103 performs, on the right screen input image 112R, the same processing as that performed by the main screen image processing unit 102, thereby generating a left screen output image 153L of 1080 p/2 (960 columns×1080 rows) and 120 fps, in which the left-eye image 60*l* and the right-eye image 60*r* are alternately arranged.

Next, the output unit 105 outputs, to the left screen driving unit 24L, the left screen output image 153L generated by the main screen image processing unit 102 as the left screen image 58L, and outputs, to the right screen driving unit 24R, the right screen output image 153R generate by the sub screen image processing unit 103 as the right screen image 58R.

Next, the left screen driving unit 24L displays the left screen image 58L on the left screen 26L of the display panel 26. In addition, the right screen driving unit 24R displays the right screen image 58R on the right screen 26R of the display panel 26.

Through the processes described above, an image of a total of 1080 p and 120 fps, in which the left screen image 58L and the right screen image 58R are included, is displayed on the display panel 26. That means that the dot clock of the image displayed on the display panel 26 is 297 MHz.

As described above, in the 3D image processing apparatus 100 according to Embodiment 1 of the present invention, each of the main screen image processing unit 102 and the sub screen image processing unit 103 processes an image having a dot clock of a maximum of 148.5 MHz, thereby making it possible to generate an image having a dot clock of 297 MHz.

Figure 16:
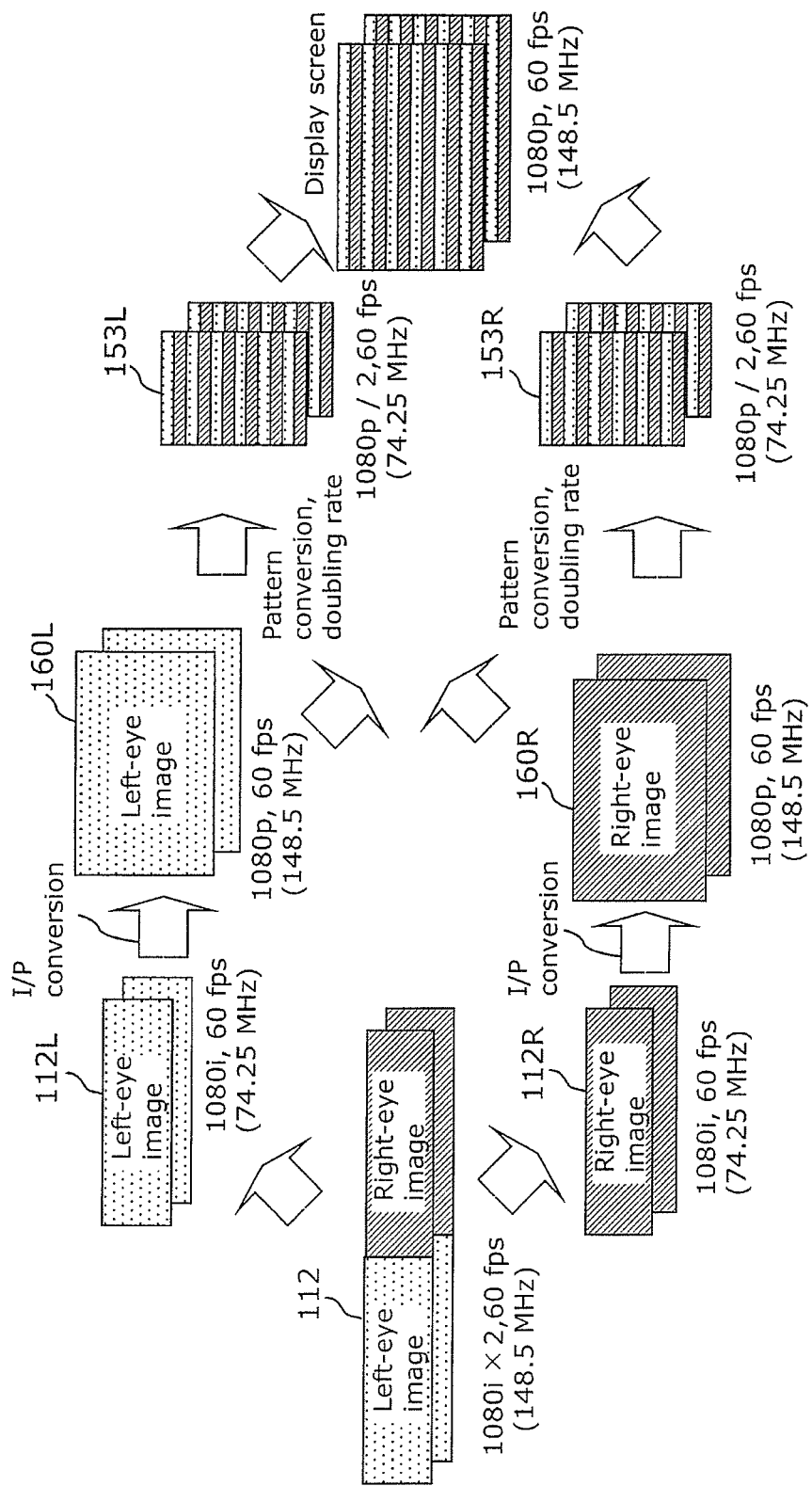
FIG. 16 is a diagram which shows an example of an operation in the 3D image processing mode performed by the 3D image processing apparatus according to Embodiment 1 of the present invention.

The following describes, with reference to FIG. 16, an operation example in the case where the format conversion is performed on the 3D image 112 so as to be an image of the line sequential.

Here, in the example shown in FIG. 16, the 3D image 112 is a full-sized image of the side by side of 1080 i and 60 fps, in the same manner as in the example shown in FIG. 13. In addition, an image of the line sequential of 1080 i and 60 fps is displayed on the display panel 26.

It is to be noted that the operations of the main screen preprocessing unit 120 and the sub screen preprocessing unit 130 are the same as those shown in FIG. 13, and thus description for them will be omitted.

In this case, the main screen postprocessing unit 121 reads, via the memory controller 141, the left screen processed image 161L that includes plural pixels corresponding to the left screen 26L of the display panel 26, among plural pixels included in the left screen processed image 160L and the right screen processed image 160R. In addition, the main screen postprocessing unit 121 performs pattern conversion on the left screen processed image 161L, thereby generating a left screen output image 153L of 1080 p/2 (960 columns×1080 rows) and 60 fps, in which the left-eye image 60*l* and the right-eye image 60*r* are alternately arranged.

To be more specific, the main screen postprocessing unit 121 reads a left half of the left screen processed image 160L and a left half of the right screen processed image 160R and arrange, in a horizontal stripe pattern, the left half of the left screen processed image 160L and the left half of the right screen processed image 160R which have been read, thereby performing the pattern conversion.

This pattern conversion reduces the image size to half. Accordingly, the dot clock of the left screen output image 153L is 74.25 MHz that is a half of the dot clock of the left screen processed image 160L.

On the other hand, the sub screen postprocessing unit 131 performs the same processing as the processing performed by the main screen postprocessing unit 121, thereby generating a right screen output image 153R of 1080 p/2 (960 columns× 1080 rows) and 60 fps, in which the left-eye image 60*l* and the right-eye image 60*r* are alternately arranged.

It is to be noted that, the output unit 105 outputs, to the left screen driving unit 24L, the left screen output image 153L generated by the main screen image processing unit 102 as the left screen image 58L, and outputs, to the right screen driving unit 24R, the right screen output image 153R generate by the sub screen image processing unit 103 as the right screen image 58R.

Next, the left screen driving unit 24L displays the left screen image 58L on the left screen 26L of the display panel 26. In addition, the right screen driving unit 24R displays the right screen image 58R on the right screen 26R of the display panel 26.

Through the processes described above, an image of a total of 1080 p and 60 fps, in which the left screen image 58L and the right screen image 58R are included, is displayed on the display panel 26. That means that the dot clock of the image displayed on the display panel 26 is 148.5 MHz.

It is to be noted that, it is only necessary for the arrangement pattern of the 3D image 112 to be one of the patterns shown in FIGS. 3A, 3B, 4A, 4B, 5A, 5B, 6A, and 6B. Likewise, it is only necessary for the arrangement pattern of the left screen output image 153L and the right screen output image 153R (images displayed on the display panel 26) to be one of the patterns shown in FIGS. 3A, 3B, 4A, 4B, 5A, 5B, 6A, and 6B.

In addition, the scanning scheme, the frame rate, and the image size of each of the 3D image 112, the left screen output image 153L, the right screen output image 153R may be different from those described above.

In addition, the above-described order of performing the processes of the reduction of the image size, the enlargement of the image size, the IP conversion, the pattern conversion, and the frame rate conversion is presented as an example, and these processes may be performed in an arbitrary order.

In addition, when the image size of the left-eye image 60*l* or the image size of the right-eye image 60*r*, each of which is included in the 3D image 112, is larger than the display image size of the display panel 26, processing of reducing the image size is performed by the main screen image processing unit 102 and the sub screen image processing unit 103.

In addition, irrespective of the image sizes of the left-eye image 60*l* and the right-eye image 60*r*, each of which is included in the 3D image 112, and the display image size of the display panel 26, the main screen preprocessing unit 120 may once reduce the image size of the left screen input image 112L, and then the main screen postprocessing unit 121 may enlarge the image size of the reduced image size so as to be the original image size. When the image size of the left-eye image 60*l* or the image size of the right-eye image 60*r*, each of which is included in the 3D image 112, is the same as the display image size of the display panel 26; that is, when the reduction or enlargement of the image size are not necessary, for example, the main screen preprocessing unit 120 may reduce the image size of the left screen input image 112L to half in the vertical direction and the main screen postprocessing unit 121 may enlarge the reduced image size to double in the vertical direction.

With this, it is possible to reduce the amount of data to be stored in the memory 140, and thus the capacity of the memory 140 can be reduced. Furthermore, the processing amount of the IP conversion unit 123, the pattern conversion unit 125, and the like can be reduced.

As described above, the 3D image processing apparatus 100 according to Embodiment 1 of the present invention divides the 3D image 112 into the left screen input image 112L and the right screen input image 112R, processes the left screen input image 112L using the main screen image processing unit 102, and processes the right screen input image 112R using the sub screen image processing unit 103. By performing the parallel processing as described above, it is possible to halve the necessary processing capacity of the main screen image processing unit 102 and the sub screen image processing unit 130, compared with the case where a single image processing unit processes the 3D image 112.

Furthermore, the 3D image processing apparatus 100 uses for parallel processing, in the two-screen processing mode, the main screen image processing unit 102 for processing the main screen image and the sub screen image processing unit 103 for processing the sub screen image, thereby avoiding addition of a circuit to a conventional image processing apparatus. Thus, the 3D image processing apparatus 100 according to Embodiment 1 of the present invention can generate a high-quality 3D image while preventing cost increase.

In addition, the processing capacity of the sub screen image processing unit 103 is generally lower than the processing capacity of the main screen image processing unit 102. In such a case, the image quality differs between the left screen output image 153L and the right screen output image 153R. Such difference can be avoided by making the processing capacity of the main screen image processing unit 102 the same as the processing capacity of the sub screen image processing unit 103. This can eliminate the ununiformity of the image quality between the left screen output image 153L and the right screen output image 153R, while the image quality of the left screen output image 153L is lowered.

It is to be noted that, the processing capacity of the sub screen image processing unit 103 may be made the same as the processing capacity of the main screen image processing unit 102. In this case, the processing capacity of the sub screen image processing unit 103 needs to be higher than that of the conventional image processing apparatus; however, it is possible to avoid cost increase for the 3D image processing apparatus 100 compared with the case where a new image processing unit is added.

Embodiment 2

An example has been described in Embodiment 1 above, in which the 3D image 112 is divided into the left screen input image 112L and the right screen input image 112R, and then all of the format conversion processes are performed in parallel on each of the left screen input image 112L and the right screen input image 112R. In Embodiment 2 according to the present invention, an example is described in which part of the format conversion processes is performed on the 3D image 112 before division of the 3D image 112 into the left screen image and the right screen image.

It is to be noted that description overlapping with Embodiment 1 will be omitted below to focus the description on a point different from Embodiment 1.

Figure 17:
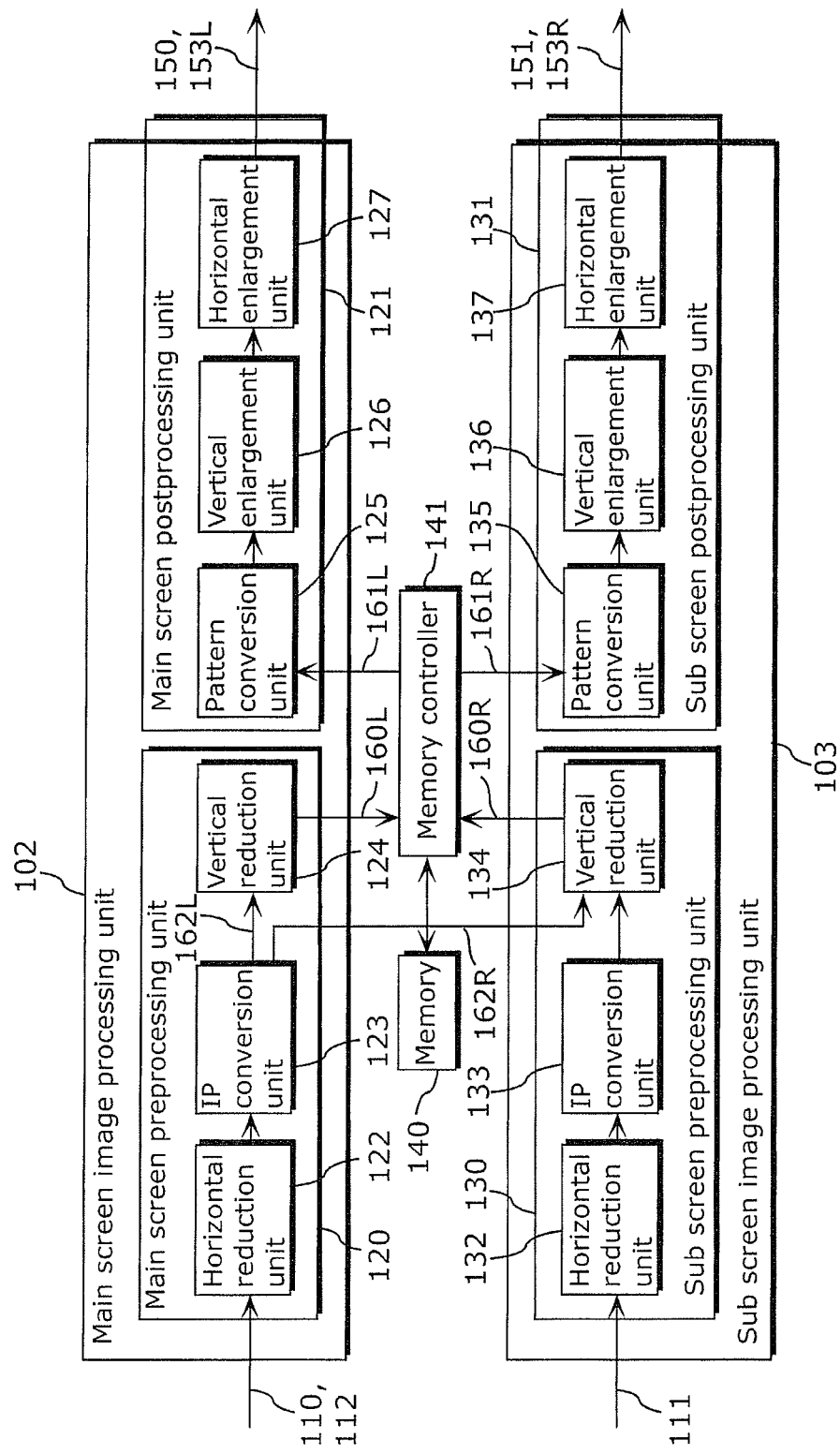
FIG. 17 is a block diagram which shows a configuration of a main screen image processing unit and a sub screen image processing unit according to Embodiment 2 of the present invention.

FIG. 17 is a block diagram which shows a configuration of a main screen image processing unit 102 and a sub screen image processing unit 103 according to Embodiment 2 of the present invention. It is to be noted that the same components as those in FIG. 10 are assigned with the same numerals. In addition, the configuration of the 3D image processing apparatus 100 according to Embodiment 2 of the present invention is the same as that in FIG. 9.

The 3D image processing apparatus 100 according to Embodiment 2 of the present invention is different form the 3D image processing apparatus 100 according to Embodiment 1 in the following points.

The input selecting unit 101 outputs the 3D image 112 to the main screen image processing unit 102 in the 3D image processing mode.

The main screen preprocessing unit 120, in the 3D image processing mode, performs image size reduction in the horizontal direction and IP conversion on the 3D image 112, and then divides the processed image into a left screen input image 162L and a right screen input image 162R. In addition, the main screen preprocessing unit 120 performs image size reduction in the vertical direction on the left screen input image 162L which is a result of the division, thereby generating a left screen processed image 160L.

The sub screen preprocessing unit 130 performs image size reduction in the vertical direction on the right screen input image 162R which is a result of the division, thereby generating a right screen processed image 160R.

The following describes an operation example performed by the 3D image processing apparatus 100 according to Embodiment 2 of the present invention in the 3D image processing mode.

Figure 18:
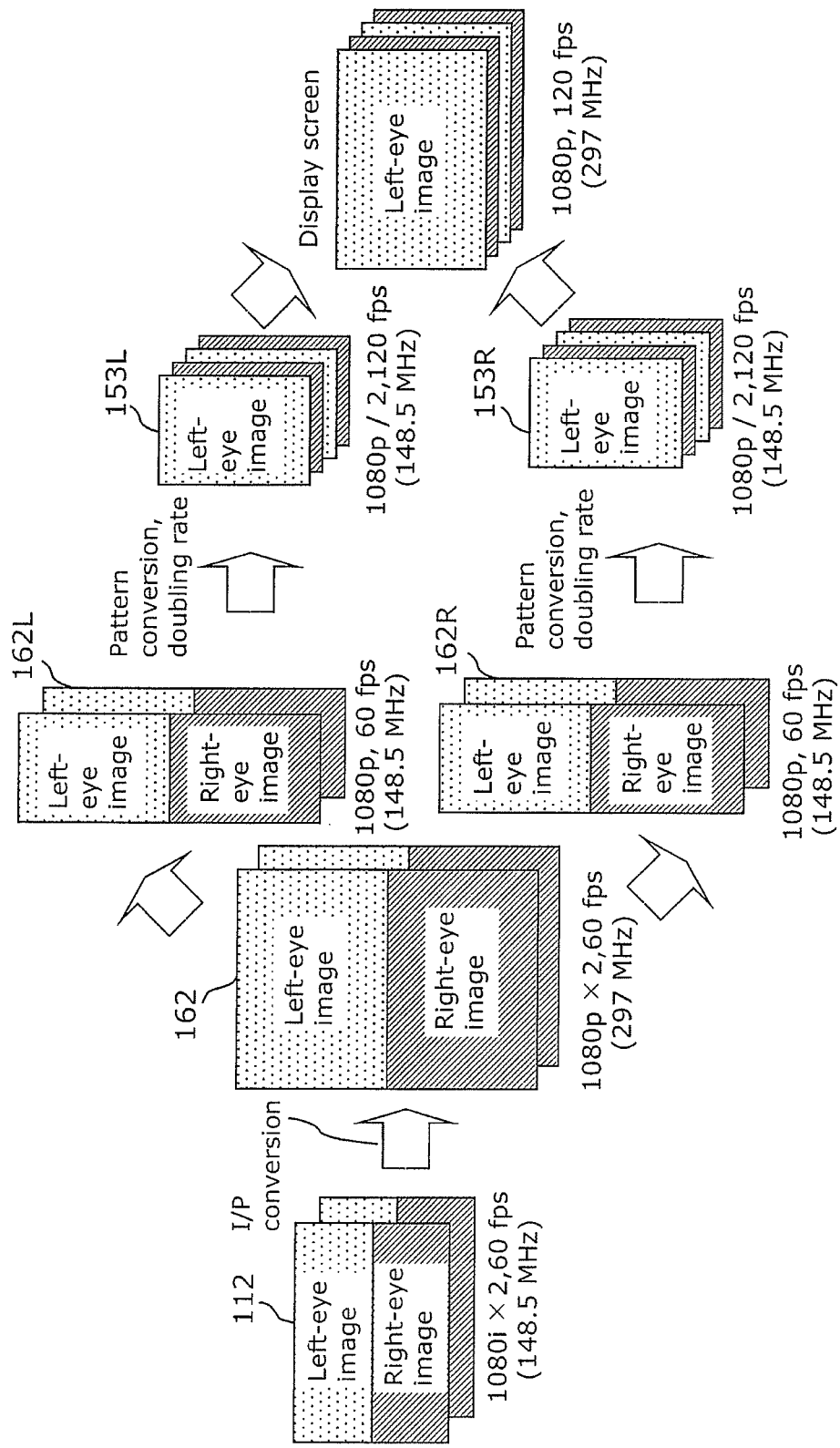
FIG. 18 is a diagram which shows an example of an operation in the 3D image processing mode performed by the 3D image processing apparatus according to Embodiment 2 of the present invention.

FIG. 18 is a diagram which shows an operation example in a 3D image processing mode performed by the 3D image processing apparatus 100 according to Embodiment 2 of the present invention.

In the 3D image processing apparatus 100 according to Embodiment 2 of the present invention, in the 3D image processing mode, the main screen preprocessing unit 120 generates a converted image 162 by performing IP conversion on the 3D image 112, and divides the converted image 162 into a left screen input image 162L and a right screen input image 162R.

Here, in the example shown in FIG. 18, the 3D image 112 is a full-sized image of the frame sequential of 1080 i and 60 fps. More specifically, the 3D image 112 includes, in one frame, a left-eye image 60*l* of 1080 i (1920 columns×540 rows) and a right-eye image 60*r* of 1080 i (1920 columns×540 rows). In other words, a dot clock of the 3D image 112 is 148.5 MHz.

In addition, an image of 1080 p and 120 fps, in which the left-eye image 60*l* and the right-eye image 60*r* are alternately arranged, is displayed on the display panel 26.

In this case, the input selecting unit 101 outputs the 3D image 112 to the main screen image processing unit 102.

Next, the main screen preprocessing unit 120 performs IP conversion on the 3D image 112, thereby generating a converted image 162 of 1080 p×2 and 60 fps. This IP conversion doubles the image size in the vertical direction. Thus, the dot clock of the converted image 162 is 297 MHz that is a double of the dot clock of the 3D image 112.

More specifically, the converted image 162 includes, in one frame, a left-eye image 60*l* of 1080 p (1920 columns×1080 rows) and a right-eye image 60*r* of 1080 p (1920 columns×1080 rows). Thus, the image size of the converted image 162 is 1920 columns×2160 rows.

Next, the main screen preprocessing unit 120 divides the converted image 162 into a left screen input image 162L and a right screen input image 162R.

Here, each of the left screen input image 162L and the right screen input image 162R has an image size that is a half of the size of the converted image 162. Accordingly, the dot clock of each of the left screen input image 162L and the right screen input image 162R is 148.5 MHz that is a half of the dot clock of the converted image 162.

More specifically, the left screen input image 162L includes, in one frame, a left-eye image 60*l* of 1080 p/2 (960 columns×1080 rows) and the right-eye image 60*r* of 1080 p/2 (960 columns×1080 rows). In addition, the right screen input image 162R includes, in one frame, a left-eye image 60*l* of 1080 p/2 (960 columns×1080 rows) and the right-eye image 60*r* of 1080 p/2 (960 columns×1080 rows).

More specifically, each of the left screen input image 162L and the right screen input image 162R has an image size of 1920 columns×1080 rows.

It is to be noted that it is preferable to concurrently perform the IP conversion processing and the dividing processing. More specifically, an image corresponding to the converted image 162 is not generated in practice. In other words, the main screen preprocessing unit 120 performs IP conversion and division on the 3D image 112, thereby generating the left screen input image 162L and the right screen input image 162R. This allows the maximum value of the dot clock of the image processed by each of the processing units to be 148.5 MHz, instead of 297 MHz.

Next, the main screen preprocessing unit 120 stores the left screen input image 162L (left screen processed image 160L) into the memory 140 via the memory controller 141.

In addition, the main screen preprocessing unit 120 outputs the right screen input image 162R to the sub screen preprocessing unit 130.

Next, the sub screen preprocessing unit 130 stores the right screen input image 162R (right screen processed image 160R) into the memory 140 via the memory controller 141.

It is to be noted that processes performed by the main screen postprocessing unit 121 and the sub screen postprocessing unit 131 are the same as those described in Embodiment 1 and thus the description for them will be omitted.

In addition, in the example of Embodiment 2 according to the present invention, the vertical reduction unit 124 and the main screen postprocessing unit 121 correspond to a first image processing unit according to the present invention and the vertical reduction unit 134 and the sub screen postprocessing unit 131 correspond to a second image processing unit according to the present invention. In addition, the IP conversion unit 123 and the IP conversion unit 133 correspond to a first IP conversion unit and a second IP conversion unit, respectively, according to the present invention. In addition, the converted image 162 corresponds to a first input 3D image according to the present invention. In addition, the main screen image 110, the sub screen image 111, the 3D image 112 correspond to a third image, a fourth image, and a second input 3D image, respectively, according to the present invention. In addition, an image generated by the IP conversion unit 123 and the IP conversion unit 133 in the two-screen processing mode correspond to a first image and a second image, respectively, according to the present invention.

Through the processes described above, an image of a total of 1080 p and 120 fps, in which the left screen image 58L and the right screen image 58R are included, is displayed on the display panel 26. That means that the dot clock of the image displayed on the display panel 26 is 297 MHz.

As described above, in the 3D image processing apparatus 100 according to Embodiment 2 of the present invention, each of the main screen image processing unit 102 and the sub screen image processing unit 103 processes an image having a dot clock of a maximum of 148.5 MHz, thereby making it possible to generate an image having a dot clock of 297 MHz.

As described above, the 3D image processing apparatus 100 according to Embodiment 2 of the present invention, like the 3D image processing apparatus 100 according to Embodiment 1, can generate a high-quality 3D image while preventing cost increase.

In addition, the above-described order of performing the processes of the reduction of the image size, the enlargement of the image size, the IP conversion, the pattern conversion, and the frame rate conversion is presented as an example, and these processes may be performed in an arbitrary order. In such a case as well, the 3D image processing apparatus 100 divides the image after IP conversion into a left screen image and a right screen image.

It is to be noted that the 3D image processing apparatus 100 may divide an image other than the image immediately after the IP conversion into a left screen image and a right screen image. More specifically, the 3D image processing apparatus 100 divides the image when the dot clock of the image after processing exceeds a predetermined frequency (148.5 MHz in the example described above) into a left screen image and a right screen image.

In addition, the 3D image processing apparatus 100 may divide the processed image before the dot clock of the image after processing exceeds a predetermined frequency (148.5 MHz in the example described above) into a left screen image and a right screen image. In this case as well, it is possible to prevent the maximum value of the dot clock of the image processed by each of the main screen image processing unit 102 and the sub screen image processing unit 103 from exceeding 148.5 MHz. The 3D image processing apparatus 100 may divide an image output from the horizontal reduction unit 122 into a left screen image and a right screen image, for example.

The 3D image processing apparatus 100 according to Embodiment 1 and Embodiment 2 of the present invention has been described above; however, the present invention is not limited to these embodiments.

For example, the case of using dedicated glasses (shutter glasses 43) has been described as an example in the above description; however, the present invention can be applied to a system in which the dedicated glasses are not used.

In addition, the case where the 3D image includes two images (left-eye image and right-eye image) between which a parallax is present has been described as an example in the above description; however, the 3D image may include more than two images between which a parallax is present.

In addition, in the description above, the main screen image processing unit 102 processes the left screen image and the sub screen image processing unit 103 processes the right screen image; however, the main screen image processing unit 102 may process the right screen image and the sub screen image processing unit 103 may process the left screen image.

In addition, in the description above, the input selecting unit 101 generates the left screen input image 112L and the right screen input image 112R by dividing the 3D image 112 in half in the horizontal direction; however, it is only necessary for each of the left screen input image 112L and the right screen input image 112R to be part of the 3D image 112. For example, the input selecting unit 101 may divide the 3D image 112 in half in the vertical direction.

In addition, the image size may be different between the left screen input image 112L and the right screen input image 112R.

In addition, the input selecting unit 101 may divide the 3D image 112 into more than two images. In this case, the 3D image processing apparatus 100 processes in parallel the three images which are results of the division. In addition, the above-described main screen image processing unit 102 and the sub screen image processing unit 103 are included in three image processing units which perform this parallel processing. It is still necessary in this case as well to add a new image processing unit to the conventional image processing apparatus; however, it is possible to reduce the number of the image processing units to be newly added, by using the sub screen image processing unit 103, and thus it is possible to prevent cost increase for the 3D image processing apparatus 100.

In addition, the input selecting unit 101 may divide the 3D image 112 into the left screen input image 112L and the right screen input image 112R such that the left screen input image 112L and the right screen input image 112R include, in part, a portion overlapping with each other. With this, when the digital television 20 includes two image quality correction units for correcting the respective images of the left screen image 58L (left screen input image 112L) and the right screen image 58R (right screen input image 112R), for example, it is possible to increase the accuracy of endpoint processing (image quality correction processing in the vicinity of the border of division) in these image quality correction units.

In addition, for the same reason, the left screen processed image 161L and the right screen processed image 161R may include, in part, a portion overlapping in the images.

Likewise, it is only necessary for the left screen output image 153L and the right screen output image 153R to be part of the output 3D image 58 which is the image displayed on the display panel 26.

In addition, in the description above, the 3D image processing apparatus 100 separately outputs the left screen image 58L and the right screen image 58R; however, the left screen image 58L and the right screen image 58R may be synthesized and then be output. Furthermore, the 3D image processing apparatus 100 may output the synthesized image 152 as it is, without dividing the synthesized image 152.

In addition, the configuration of the 3D image processing apparatus 100 described above is presented as an example for explaining the present invention in detail, and the 3D image processing apparatus according to the present invention need not necessarily include all the configuration described above.

For example, the main screen image processing unit 102 and the sub screen image processing unit 103 have all of the functions of the reduction of the image size, the enlargement of the image size, the IP conversion, the pattern conversion, and the frame rate conversion. However, it is only necessary for the main screen image processing unit 102 and the sub screen image processing unit 103 to have at least one of the functions.

In addition, in the description above, an example has been described in which the 3D image processing apparatus 100 includes the memory 140 and the memory controller 141 used commonly by the main screen image processing unit 102 and the sub screen image processing unit 103; however, the main screen image processing unit 102 and the sub screen image processing unit 103 may separately include a memory.

In addition, in the description above, an example has been described in which the 3D image processing apparatus 100 according to the present invention is applied to a digital television or a digital video recorder. However, the 3D image processing apparatus 100 according to the present invention can be applied to 3D image displaying apparatuses other than the digital televisions, which display 3D images, such as mobile telephone devices, personal computers, and so on. In addition, the 3D image processing apparatus 100 according to the present invention can be applied to 3D image output apparatuses other than the digital video recorders, which output 3D images, such as BD players, and so on.

In addition, the 3D image processing apparatus 100 according to Embodiments 1 and 2 described above is embodied typically as an LSI that is an integrated circuit. They may be integrated separately, or a part or all of them can be integrated into a single chip.

In addition, an integrated circuit used for such an embodiment is not limited to an LSI, and it may be embodied as a dedicated circuit or a general-purpose processor. It is also possible to use a field programmable gate array (FPGA) which can be programmed in the field after manufacturing an LSI, or a reconfigurable processor in which connection and setting of circuit cells inside an LSI can be reconfigured Furthermore, when a technology for the integrated circuit replacing LSI is developed with the advance of semiconductor technology or relevant technology, each of the processing units can be integrated using the technology.

In addition, part or all of the functions of the 3D image processing apparatuses 100 and 100B according to Embodiments 1 and 2 of the present invention may be implemented by executing a program by a processor such as a CPU.

Furthermore, the present invention may be the above-described program or a recording medium on which the above-described program is recorded. Furthermore, it should be understood that such a program can be distributed via a transmission medium such as the Internet.

In addition, at least part of the functions of the 3D image processing apparatuses 100 and 100B according to Embodiments 1 and 2 described above and their modification examples may be combined.

In addition, all of the numbers used above are used for exemplification so as to explain the present invention in detail, and thus the present invention is not limited by the numbers that have been presented for exemplification.

Furthermore, other forms in which various modifications apparent to those skilled in the art are applied to the embodiment are included within the scope of the present invention, unless such changes and modifications depart from the scope of the present invention.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be applied to 3D image processing apparatuses, and in particular to digital televisions, digital video recorders, and so on.

What is claimed is:

1. A three-dimensional (3D) image processing apparatus which has (i) a two-screen processing mode in which a synthesized image including a first image and a second image in a single screen is generated and (ii) a 3D image processing mode in which a first input 3D image in a first format is converted into an output 3D image in a second format, said 3D image processing apparatus comprising:
a first image processing unit configured to perform, in the two-screen processing mode, a first format conversion process on the first image to generate a first processed image;
a second image processing unit configured to perform, in the two-screen processing mode, a second format conversion process on the second image to generate a second processed image;
a synthesizing unit configured to synthesize the first processed image and the second processed image to generate the synthesized image; and
an output unit configured to output the synthesized image in the two-screen processing mode and output the output 3D image in the 3D image processing mode,
wherein said first image processing unit is configured to perform, in the 3D image processing mode, a third format conversion process on a left screen input image that is a left half of the first input 3D image, to generate a left screen output image that is a left half of the output 3D image,
said second image processing unit is configured to perform, in the 3D image processing mode, a fourth format conversion process on a right screen input image that is a right half of the first input 3D image, to generate a right screen output image that is a right half of the output 3D image,
said output processing unit is configured to output the left screen output image and the right screen output image in the 3D image processing mode,
wherein each of the first, second, third, and fourth format conversion processes includes at least one of changing an image size, converting a frame rate, and conversion from an interlace scheme to a progressive scheme, and
at least one of the third and fourth format conversion processes includes increasing a frame rate.

2. The 3D image processing apparatus according to claim 1, wherein the first input 3D image and the output 3D image include a left-eye image viewed by a left eye of a viewer and a right-eye image viewed by a right eye of the viewer, and each of the third and fourth format conversion processes further includes changing an arrangement pattern of the left-eye image and the right-eye image.

3. The 3D image processing apparatus according to claim 1, wherein each of the first, second, third, and fourth format conversion processes includes the conversion from the interlace scheme to the progressive scheme.

4. The 3D image processing apparatus according to claim 3, further comprising a memory, wherein said first image processing unit includes a first preprocessing unit configured to generate, in the 3D image processing mode, a third processed image by performing a first preprocess on the left screen input image, and store the third processed image in said memory, the first preprocess being included in the third format conversion process and including reducing the image size, said second image processing unit includes a second preprocessing unit configured to generate, in the 3D image processing mode, a fourth processed image by performing a second preprocess on the right screen input image, and store the fourth processed image in said memory, the second preprocess being included in the fourth format conversion process and including the reducing the image size, and said first image processing unit further includes: a first postprocessing unit configured to generate, in the 3D image processing mode, the left screen output image by performing a first postprocess on a fifth processed image including at least one of the third processed image and the fourth processed image which are stored in said memory, the first postprocess being included in the third format conversion process and including enlarging the image size; and a second postprocessing unit configured to generate, in the 3D image processing mode, the right screen output image by performing a second postprocess on a sixth processed image including at least one of the third processed image and the fourth processed image which are stored in said memory, the second postprocess being included in the fourth format conversion process and including the enlarging the image size.

5. The 3D image processing apparatus according to claim 4, wherein each of the first and second postprocesses further includes changing an arrangement pattern of the left-eye image and the right-eye image, said first postprocessing unit is configured to generate the left screen output image by reading the fifth processed image and performing the first postprocess on the fifth processed image, the fifth processed image including pixels corresponding to the left screen output image, among pixels included in the third processed image and the fourth processed image which are stored in said memory, and said second postprocessing unit is configured to generate the right screen output image by reading the sixth processed image and performing the second postprocess on the sixth processed image, the sixth processed image including pixels corresponding to the right screen output image, among pixels included in the third processed image and the fourth processed image which are stored in said memory.

6. The 3D image processing apparatus according to claim 4, wherein each of the first and second preprocesses includes the conversion from the interlace scheme to the progressive scheme, of a scanning scheme.

7. The 3D image processing apparatus according to claim 1, wherein each of the first, second, third, and fourth format conversion processes includes at least one of changing an image size and converting a frame rate, said 3D image processing apparatus further comprises: a first IP conversion unit configured to generate, in the two-screen processing mode, the first image by converting a third image from an interlace scheme to a progressive scheme; and a second IP conversion unit configured to generate, in the two-screen processing mode, the second image by converting a fourth image from the interlace scheme to the progressive scheme, and said first IP conversion unit is configured to generate, in the 3D image processing mode, the first input 3D image by converting a second input 3D image from the interlace scheme to the progressive scheme.

8. The 3D image processing apparatus according to claim 1, further comprising an input selecting unit configured to divide, in the 3D image processing mode, the first input 3D image into the left screen input image and the right screen input image.

9. A method of controlling a three-dimensional (3D) image processing apparatus which has (i) a two-screen processing mode in which a synthesized image including a first image and a second image in a single screen is generated and (ii) a 3D image processing mode in which a first input 3D image in a first format is converted into an output 3D image in a second format, and which includes a first image processing unit and a second image processing unit, said method of controlling a three-dimensional (3D) image processing apparatus comprising:
performing a first format conversion process on the first image by the first image processing unit in the two-screen processing mode, to generate a first processed image;
performing a second format conversion process on the second image by the second image processing unit in the two-screen processing mode, to generate a second processed image;
synthesizing the first processed image and the second processed image to generate the synthesized image;
performing a third format conversion process on a left screen input image that is a left half of the first input 3D image by the first image processing unit in the 3D image processing mode, to generate a left screen output image that is a left half of the output 3D image, performing a fourth format conversion process on a right screen input image that is a right half of the first input 3D image by the second image processing unit in the 3D image processing mode, to generate a right screen output image that is a right half of the output 3D image, outputting the synthesized image in the two-screen processing mode; and
outputting the left screen output image and the right screen output image in the 3D image processing mode,
wherein each of the first, second, third, and fourth format conversion processes includes at least one of changing an image size, converting a frame rate, and conversion from an interlace scheme to a progressive scheme, and
at least one of the third and fourth format conversion processes includes increasing a frame rate.

* * * * *